United States Patent
Morris

(10) Patent No.: US 8,233,482 B2
(45) Date of Patent: Jul. 31, 2012

(54) METHODS, SYSTEMS, AND COMPUTER PROGRAM PRODUCTS FOR DISABLING AN OPERATIVE COUPLING TO A NETWORK

(76) Inventor: Robert Paul Morris, Raleigh, NC (US)

( * ) Notice: Subject to any disclaimer, the term of this patent is extended or adjusted under 35 U.S.C. 154(b) by 238 days.

(21) Appl. No.: 12/764,999

(22) Filed: Apr. 22, 2010

(65) Prior Publication Data

US 2011/0261816 A1 Oct. 27, 2011

(51) Int. Cl.
*H04L 12/56* (2006.01)
(52) U.S. Cl. ........ 370/392; 370/311; 370/351; 370/380; 709/238
(58) Field of Classification Search .................. 370/331, 370/401, 252, 392; 709/238
See application file for complete search history.

(56) References Cited

U.S. PATENT DOCUMENTS

| | | | |
|---|---|---|---|
| 6,418,124 | B2 | 7/2002 | Brabenac |
| 7,590,408 | B2 * | 9/2009 | Dyck et al. ............. 455/411 |
| 7,672,248 | B2 | 3/2010 | Morris |
| 2007/0286215 | A1 * | 12/2007 | Morris ................. 370/401 |
| 2009/0135753 | A1 | 5/2009 | Veillette |
| 2009/0154421 | A1 | 6/2009 | Hong |
| 2009/0222576 | A1 | 9/2009 | Elstermann |
| 2009/0252072 | A1 * | 10/2009 | Lind et al. ............. 370/311 |
| 2010/0011445 | A1 | 1/2010 | Kori |
| 2010/0128645 | A1 * | 5/2010 | Lin et al. ............. 370/311 |
| 2010/0165899 | A1 * | 7/2010 | Van Bosch et al. ....... 370/311 |

FOREIGN PATENT DOCUMENTS

WO WO 2005/076881 * 8/2005

OTHER PUBLICATIONS

AMD, Magic Packet Technology, White Paper Publication # 20213 Rev:A Amendment:0, Nov. 1995, Advanced Micro Device, Inc.
DMTF, Dash Implementation Requirements, Document No. DSP0232, Version 1.1.0, Jun. 22, 2009, Distributed Management Task Force, Inc.
DMTF, Systems Management Architecture for Mobile and Desktop Hardware White Paper, Document No. DSP2014, Version 1.1.0, Dec. 2007, Distributed Management Task Force, Inc.
DMTF, Boot Profile, Document No. DSP1012, Version 1.0.1, Jun. 22, 2009, Distributed Management Task Force, Inc.

* cited by examiner

*Primary Examiner* — Man Phan
*Assistant Examiner* — Mewale Ambaye

(57) ABSTRACT

Methods and systems are described for disabling an operative coupling to a network. In an aspect, first data received for forwarding is forwarded between a first node in a first network and a second node in a second network by a network relay via a first operative coupling to the first network of a first network interface hardware component in the network relay and via a second operative coupling to the second network of a second network interface hardware component in the network relay. A determination is made that a specified decoupling condition is met. The second operative coupling is disabled subsequent to the forwarding and in response to the determination while the first operative coupling remains enabled for receiving second data for forwarding.

21 Claims, 8 Drawing Sheets

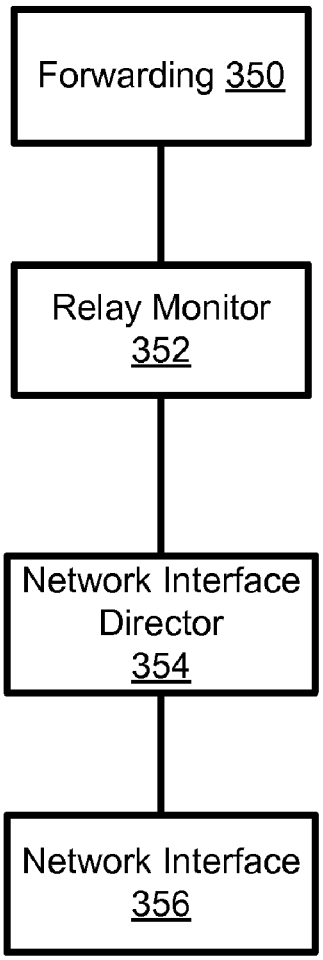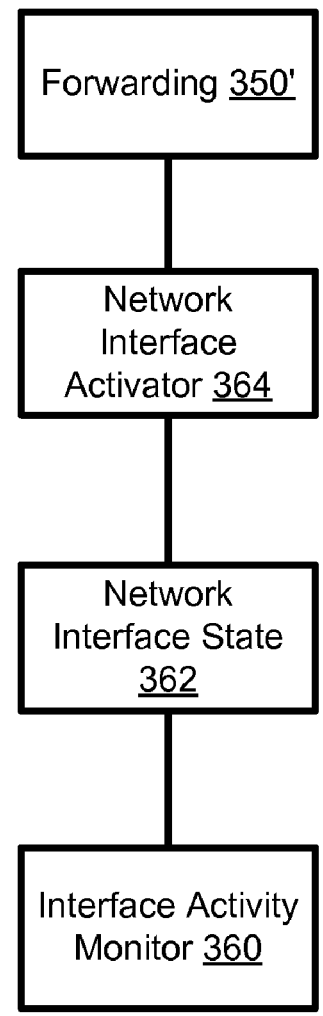
Fig. 3a
Fig. 3b ered U.S. patent applications, the entire disclosure of each
METHODS, SYSTEMS, AND COMPUTER PROGRAM PRODUCTS FOR DISABLING AN OPERATIVE COUPLING TO A NETWORK

RELATED APPLICATIONS

This application is related to the following commonly owned U.S. patent applications, the entire disclosure of each being incorporated by reference herein: application Ser. No. 12/765,000 filed on Apr. 22, 2010, entitled "Methods, Systems, and Program Products for Enabling an Operative Coupling to a Network."

BACKGROUND

Networks are separated by network relay devices such as routers, switches, and gateways. These devices and their included network interface hardware components remain powered on in a typical day. For homes and businesses there are situations where there is no one active on a network in the home or business side of a network relay device. Nevertheless, the network relay device remains powered on with its interface to an outside network active. This makes not only the network relay device accessible to malicious traffic, it makes the inside network and everything connected to it, potentially vulnerable. Firewalls are one tool used to protect the network relay device and the inside network.

One solution is to turn the network relay device off. This solution works best when there is a known time period when the first or inside network is not being used. This solution is not ideal in less predictable situations. In some situations the network relay device serves to connect devices on the inside network. Turning the relay device off when there is no traffic with the outside prevents at least some communication on the inside network in these situations. The reader will understand that "inside" and "outside" are relative terms for describing a network and its nodes from a particular perspective.

Since all these solutions require network interface hardware components of a network relay device to use energy even when there is no legitimate traffic between networks connected by a network relay device, these solutions use some energy unnecessarily.

Accordingly, there exists a need for methods, systems, and computer program products for disabling an operative coupling to a network.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods and systems are described for disabling an operative coupling to a network. In one aspect, the method includes forwarding first data received for forwarding between a first node in a first network and a second node in a second network by a network relay via a first operative coupling to the first network of a first network interface hardware component in the network relay and via a second operative coupling to the second network of a second network interface hardware component in the network relay. The method further includes determining a specified decoupling condition is met. The method still further includes, subsequent to forwarding the first data and in response to determining the decoupling condition is met, disabling the second operative coupling while the first operative coupling remains enabled for receiving second data for forwarding.

Further, a system for disabling an operative coupling to a network is described. The system includes an execution environment including an instruction processing unit configured to process an instruction included in at least one of a forwarding component, a forwarding monitor component, and a network interface director component. The system includes the forwarding component configured for forwarding first data received for forwarding between a first node in a first network and a second node in a second network by a network relay via a first operative coupling to the first network of a first network interface hardware component in the network relay and via a second operative coupling to the second network of a second network interface hardware component in the network relay. The system further includes the forwarding monitor component configured for determining a specified decoupling condition is met. The system still further includes the network interface director component configured for, subsequent to forwarding the first data and in response to determining the decoupling condition is met, disabling the second operative coupling while the first operative coupling remains enabled for receiving second data for forwarding.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which:

FIG. 3a is a block a diagram illustrating an arrangement of components for disabling an operative coupling to a network according to another aspect of the subject matter described herein;

FIG. 3b is a block a diagram illustrating an arrangement of components for enabling an operative coupling to a network according to another aspect of the subject matter described herein;

DETAILED DESCRIPTION

Figure 1:
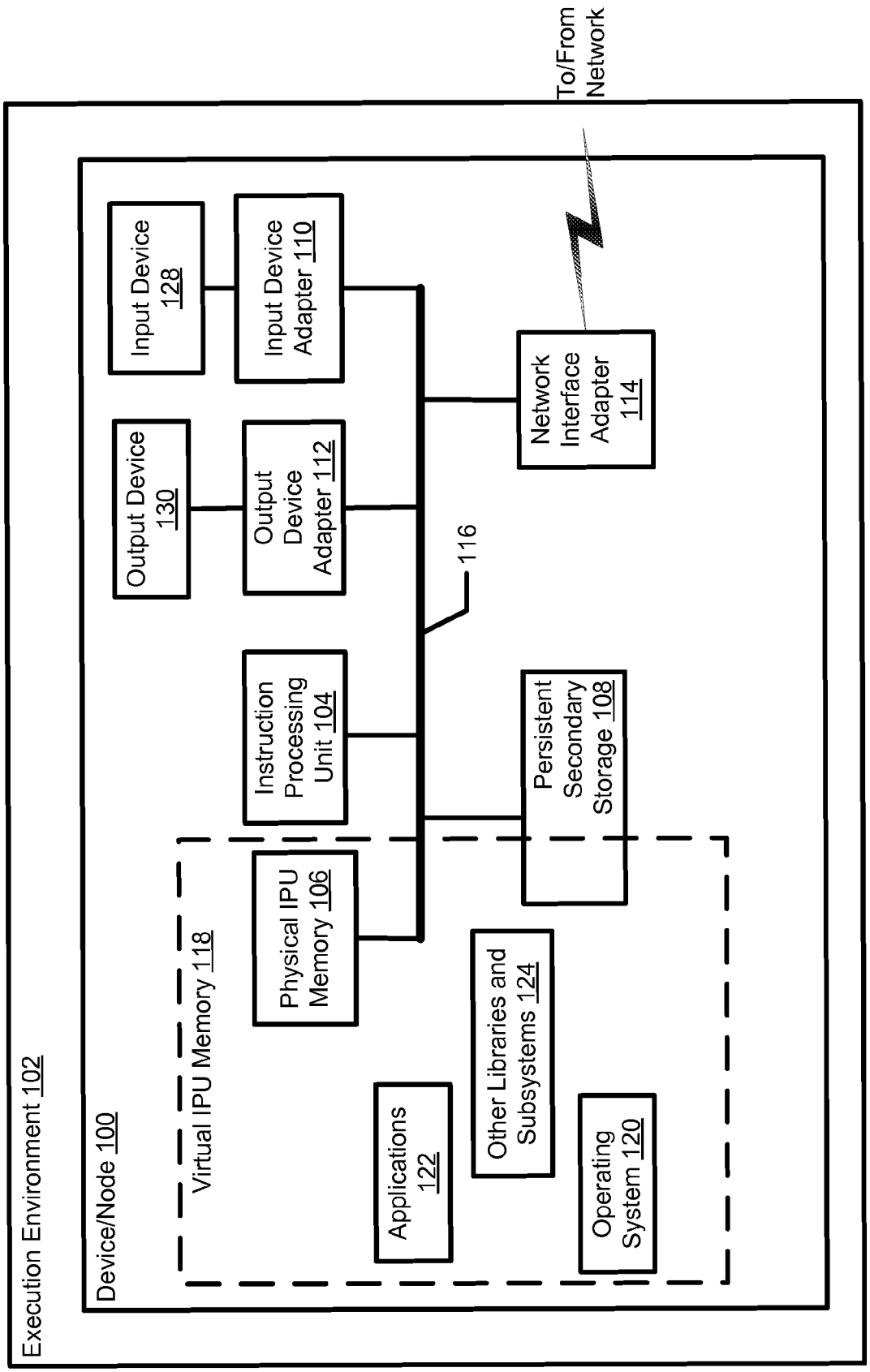
FIG. 1 is a block diagram illustrating an exemplary hardware device included in and/or otherwise providing an execution environment in which the subject matter may be implemented.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art that one or more aspects of the disclosure may be practiced with a lesser degree of these specific details. In other instances, well-known structures and devices are shown in block diagram form in order to facilitate describing one or more aspects of the disclosure.

An exemplary device included in an execution environment that may be configured according to the subject matter is illustrated in FIG. 1. An execution environment includes an arrangement of hardware and, optionally, software that may be further configured to include an arrangement of components for performing a method of the subject matter described herein.

An execution environment includes and/or is otherwise provided by one or more devices. An execution environment may include a virtual execution environment including software components operating in a host execution environment. Exemplary devices included in or otherwise providing suitable execution environments for configuring according to the subject matter include routers, switches, hubs, gateways, bridges, modems (e.g. DSL and/or cable), personal computers, notebook computers, tablet computers, servers, handheld and other mobile devices, multiprocessor devices, distributed devices, consumer electronic devices, and/or network-enabled devices. Those skilled in the art will understand that the components illustrated in FIG. 1 are exemplary and may vary by particular execution environment FIG. 1 illustrates hardware device 100 included in execution environment 102.

FIG. 1 illustrates execution environment 102 includes instruction-processing unit (IPU) 104, such as one or more microprocessors; physical processor memory 106 including storage locations identified by addresses in a physical memory address space of IPU 104; persistent secondary storage 108, such as one or more hard drives and/or flash storage media; input device adapter 110, such as a key or keypad hardware, a keyboard adapter, and/or a mouse adapter; output device adapter 112, such as a display or audio adapter for presenting information to a user; a network interface component, illustrated by network interface adapter 114, for communicating via a network such as a LAN and/or WAN; and a communication mechanism that couples elements 104-114, illustrated as bus 116. Elements 104-114 may be operatively coupled by various means. Bus 116 may comprise any type of bus architecture, including a memory bus, a peripheral bus, a local bus, and/or a switching fabric.

IPU 104 is an instruction execution machine, apparatus, or device. Exemplary IPUs include one or more microprocessors, digital signal processors (DSP), graphics processing units, application-specific integrated circuits (ASIC), and/or field programmable gate arrays (FPGA). In the description of the subject matter herein, the terms "IPU" and "processor" are used interchangeably. IPU 104 may access machine code instructions and data via one or more memory address spaces in addition to the physical memory address space. A memory address space includes addresses identifying locations in a processor memory. The addresses in a memory address space define a processor memory. IPU 104 may have more than one processor memory. Thus, IPU 104 may have more than one memory address space. IPU 104 may access a location in a processor memory by processing an address identifying the location. The processed address may be in an operand of a machine code instruction and/or may be identified in a register or other portion of IPU 104.

FIG. 1 illustrates virtual processor memory 118 spanning at least part of physical processor memory 106 and at least part of persistent secondary storage 108. Virtual memory addresses in a memory address space may be mapped to physical memory addresses identifying locations in physical processor memory 106. An address space for identifying locations in a virtual processor memory is referred to as a virtual memory address space; its addresses are referred to as virtual memory addresses; and its processor memory is known as a virtual processor memory or virtual memory. The term "processor memory" may refer to physical processor memory 106 and/or virtual processor memory 118 depending on the context in which the term is used.

Various types of memory technologies may be included in physical processor memory 106. Exemplary memory technologies include static random access memory (SRAM) and/or dynamic RAM (DRAM) including variants such as dual data rate synchronous DRAM (DDR SDRAM), error correcting code synchronous DRAM (ECC SDRAM), and/or RAMBUS DRAM (RDRAM). Physical processor memory 106 may include volatile memory as illustrated in the previous sentence and/or may include nonvolatile memory such as nonvolatile flash RAM (NVRAM) and/or ROM.

Persistent secondary storage 108 may include one or more flash memory storage devices, one or more hard disk drives, one more magnetic disk drives, and/or one or more optical disk drives. Persistent secondary storage may include removable media. The drives and their associated computer-readable storage media provide volatile and/or nonvolatile storage for computer readable instructions, data structures, program components, and other data for execution environment 102.

Execution environment 102 may include software components stored in persistent secondary storage 108, in remote storage accessible via a network, and/or in a processor memory. FIG. 1 illustrates execution environment 102 including operating system 120, one or more applications 122, other program code and/or data components illustrated by other libraries and subsystems 124. In an aspect, some or all software components may be stored in locations accessed by IPU 104 in a shared memory address space shared by the software components. The software components accessed via the shared memory address space are stored in a shared processor memory defined by the shared memory address space. In another aspect, a first software component may be stored in one or more locations accessed by IPU 104 in a first address space and a second software component may be stored in one or more locations accessed by IPU 104 in a second address space. The first software component is stored in a first processor memory defined by the first address space and the second software component is stored in a second processor memory defined by the second address space.

Software components typically include instructions executed by IPU 104 in a context referred to as a "process". A process may include one or more "threads". A thread includes a sequence of instructions executed by IPU 104 in a thread context. The terms "thread" and "process" may be used interchangeably herein when a process includes only one thread.

Execution environment 102 may receive user-provided information via one or more input devices illustrated by input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding communication interfaces such a serial port, a parallel port, and/or a universal serial bus (USB) port. Input device adapter 110 receives input and provides a representation to bus 116 to be received by IPU 104, physical processor memory 106, and/or other components included in execution environment 102.

Output device 130 in FIG. 1 exemplifies one or more output devices that may be included in and/or may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion producing devices, and other output devices producing sensory information detectable by a user.

A device included in or otherwise providing an execution environment may operate in a networked environment communicating with one or more devices via one or more network interface components. The terms communication interface and network interface component are used interchangeably. FIG. 1 illustrates network interface adapter (NIA) 114 as a network interface component included in execution environment 102 to operatively couple device 100 to a network. A network interface component includes a network interface hardware (NIH) component and optionally a software component. The terms network node and node in this document both refer to a device having a network interface component for operatively coupling the device to a network.

Exemplary network interface components include network interface controllers, network interface cards, network interface adapters, and line cards. A network interface component may interoperate with a wired network and/or a wireless network. Exemplary wireless networks include a BLUETOOTH network, a wireless 802.11 network, and/or a wireless telephony network (e.g., a cellular, PCS, CDMA, and/or GSM network). Exemplary network interface components for wired networks include Ethernet adapters, Token-ring adapters, FDDI adapters, asynchronous transfer mode (ATM) adapters, and modems of various types. Exemplary networks also include intranets and internets such as the Internet. Exemplary wired and/or wireless networks include various types of LAN, WANS, and/or personal area networks (PANs).

Figure 2A:
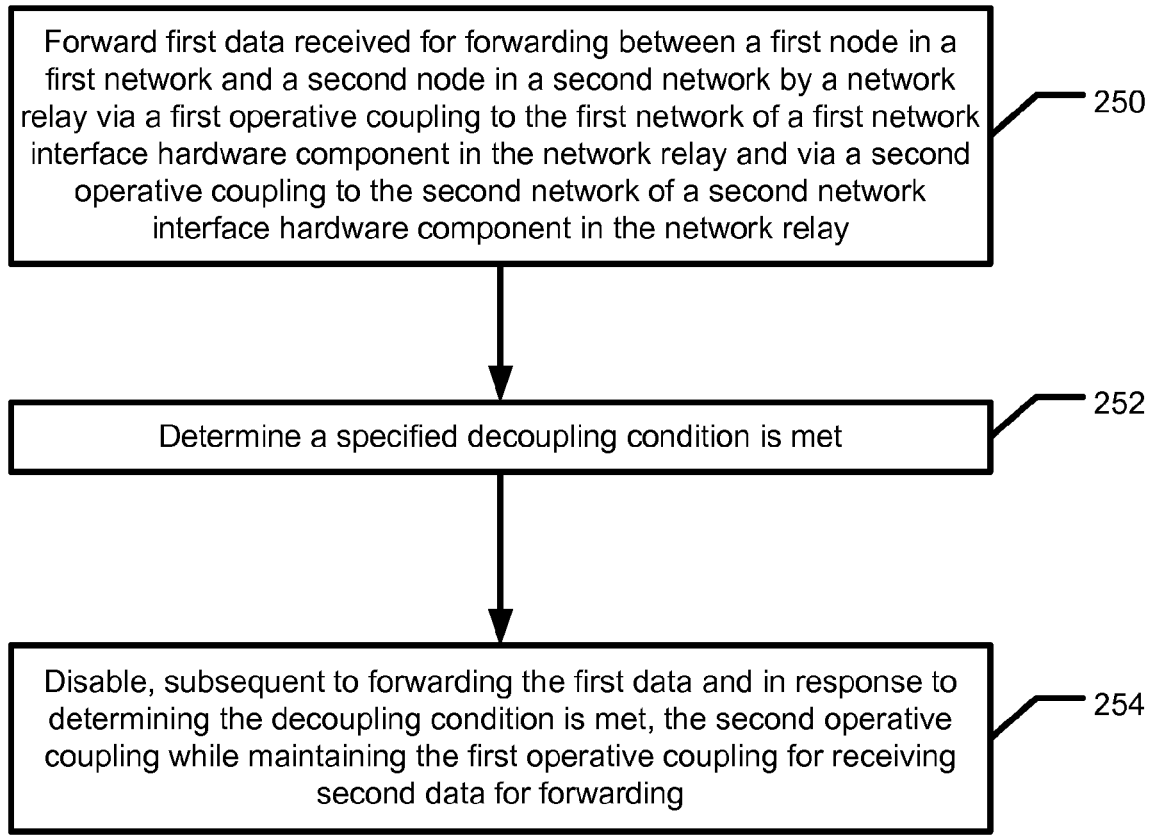
FIG. 2a is a flow diagram illustrating a method for disabling an operative coupling to a network according to an aspect of the subject matter described herein.
Figure 2B:
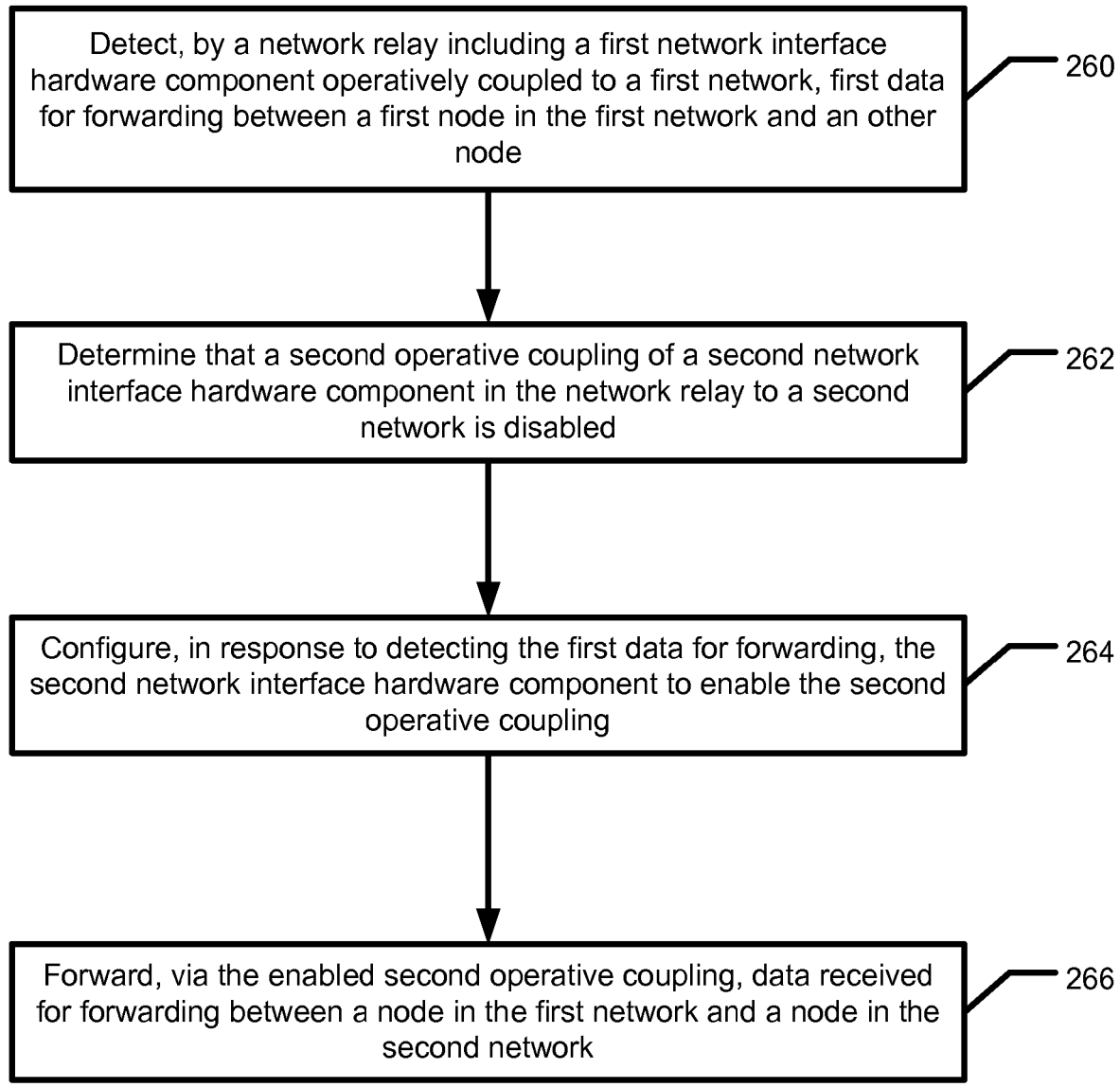
FIG. 2b is a flow diagram illustrating a method for enabling an operative coupling to a network according to an aspect of the subject matter described herein.
Figure 4:
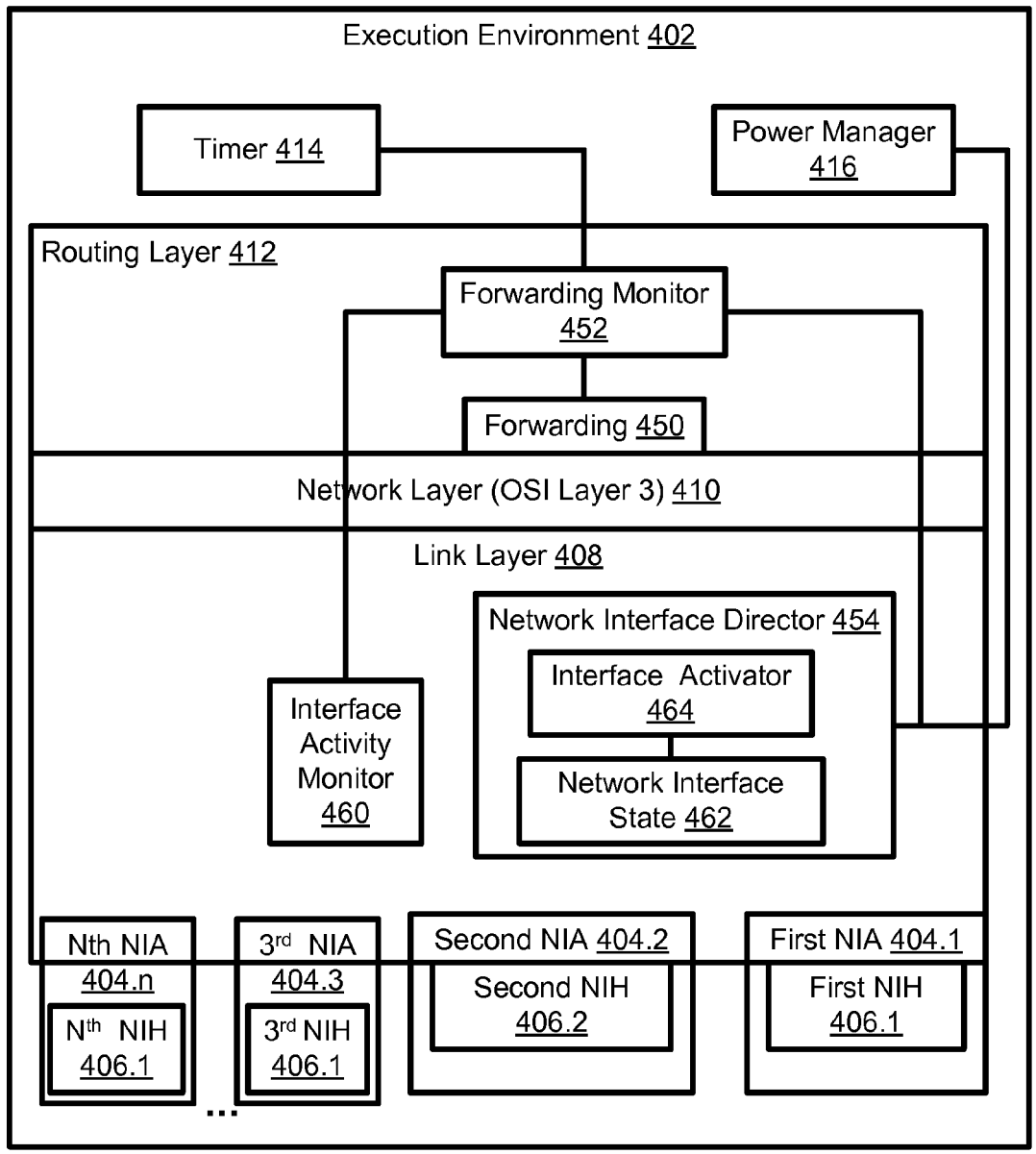
FIG. 4 is a block diagram illustrating an arrangement of components for disabling an operative coupling to a network according to another aspect of the subject matter described herein and illustrating an arrangement of components for enabling an operative coupling to a network according to another aspect of the subject matter described herein.

FIG. 2a is a flow diagram illustrating a method for disabling an operative coupling to a network according to an exemplary aspect of the subject matter described herein. FIG. 2b is a flow diagram illustrating a method for enabling an operative coupling to a network according to an exemplary aspect of the subject matter described herein. FIG. 3a is a block diagram illustrating an arrangement of components for performing the method illustrated in FIG. 2a according to another exemplary aspect of the subject matter described herein. FIG. 3b is a block diagram illustrating an arrangement of components for performing the method illustrated in FIG. 2b according to still another exemplary aspect of the subject matter described herein. In various aspects, a system may be configured to perform one or both of the methods illustrated in FIG. 2a and FIG. 2b. For ease of illustration, FIG. 4 illustrates an execution environment that includes adaptations of both arrangements in FIG. 3a and FIG. 3b.

A system for disabling an operative coupling to a network, performing the method illustrated in FIG. 2a, includes an execution environment, such as execution environment 102 in FIG. 1, including an instruction processing unit, such as processor 104, configured to process an instruction included in at least one of a forwarding component 350, a forwarding monitor component 352, and a network interface director component 354 illustrated in FIG. 3a.

A system for enabling an operative coupling to a network, performing the method illustrated in FIG. 2b, includes an execution environment, such as execution environment 102 in FIG. 1, including an instruction processing unit, such as processor 104, configured to process an instruction included in at least one of an interface activity monitor component 360, a network interface state component 362, an interface activator component 364, and a forwarding component 350' illustrated in FIG. 3b.

Figure 5:
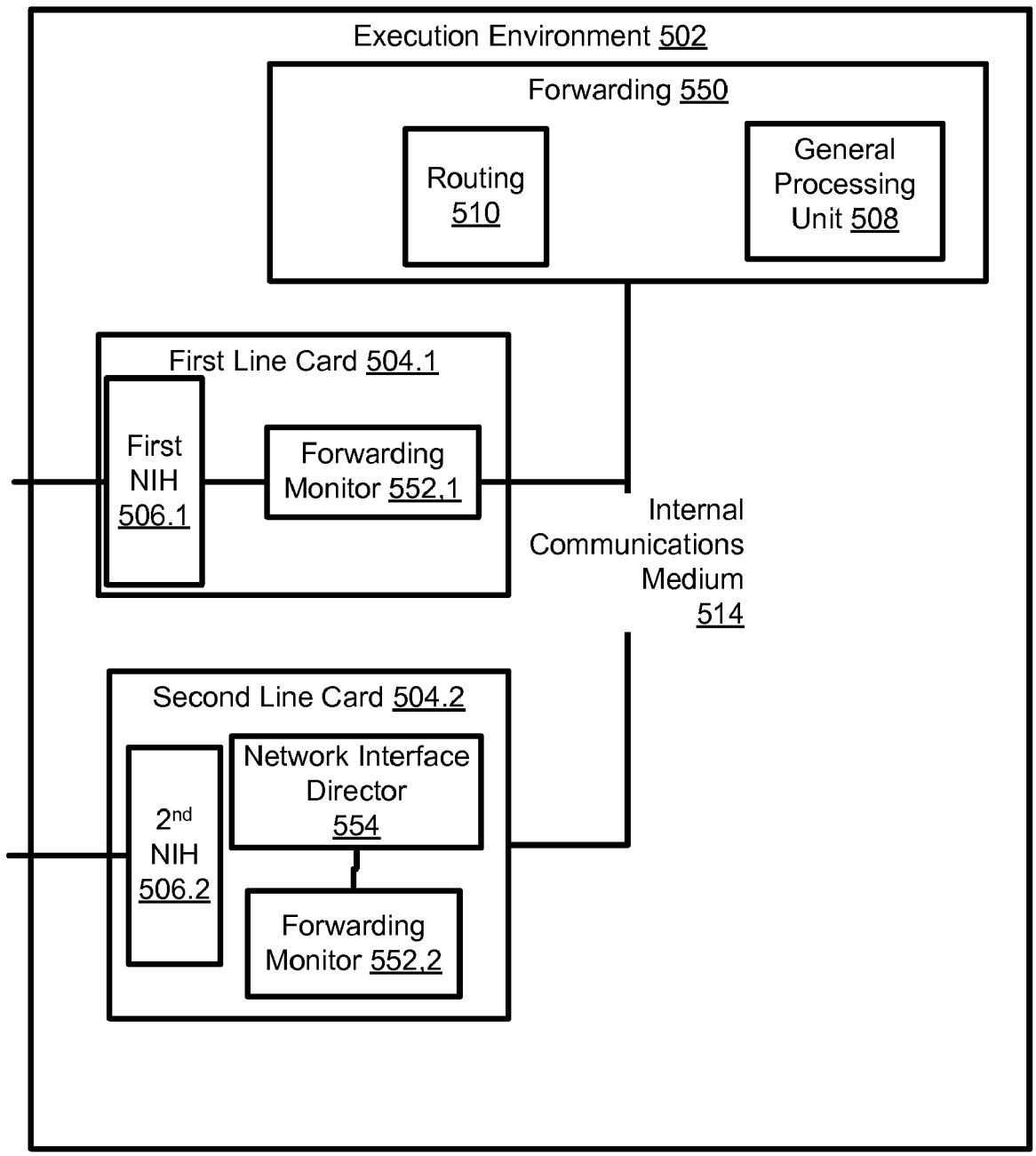
FIG. 5 is a block diagram illustrating an arrangement of components for disabling an operative coupling to a network according to another aspect of the subject matter described herein.

Components illustrated in FIG. 3a may be adapted for performing the method illustrated in FIG. 2a in a number of varying execution environments. FIG. 4 and FIG. 5 illustrate block diagrams including adaptations of the arrangement of components in FIG. 3a and/or analogs of the components in FIG. 3a adapted for operation, respectively, in execution environment 402 and in execution environment 502 including and/or otherwise provided by one or more nodes. The method depicted in FIG. 2a may be carried out by some or all of the exemplary components and/or their analogs.

Figure 6:
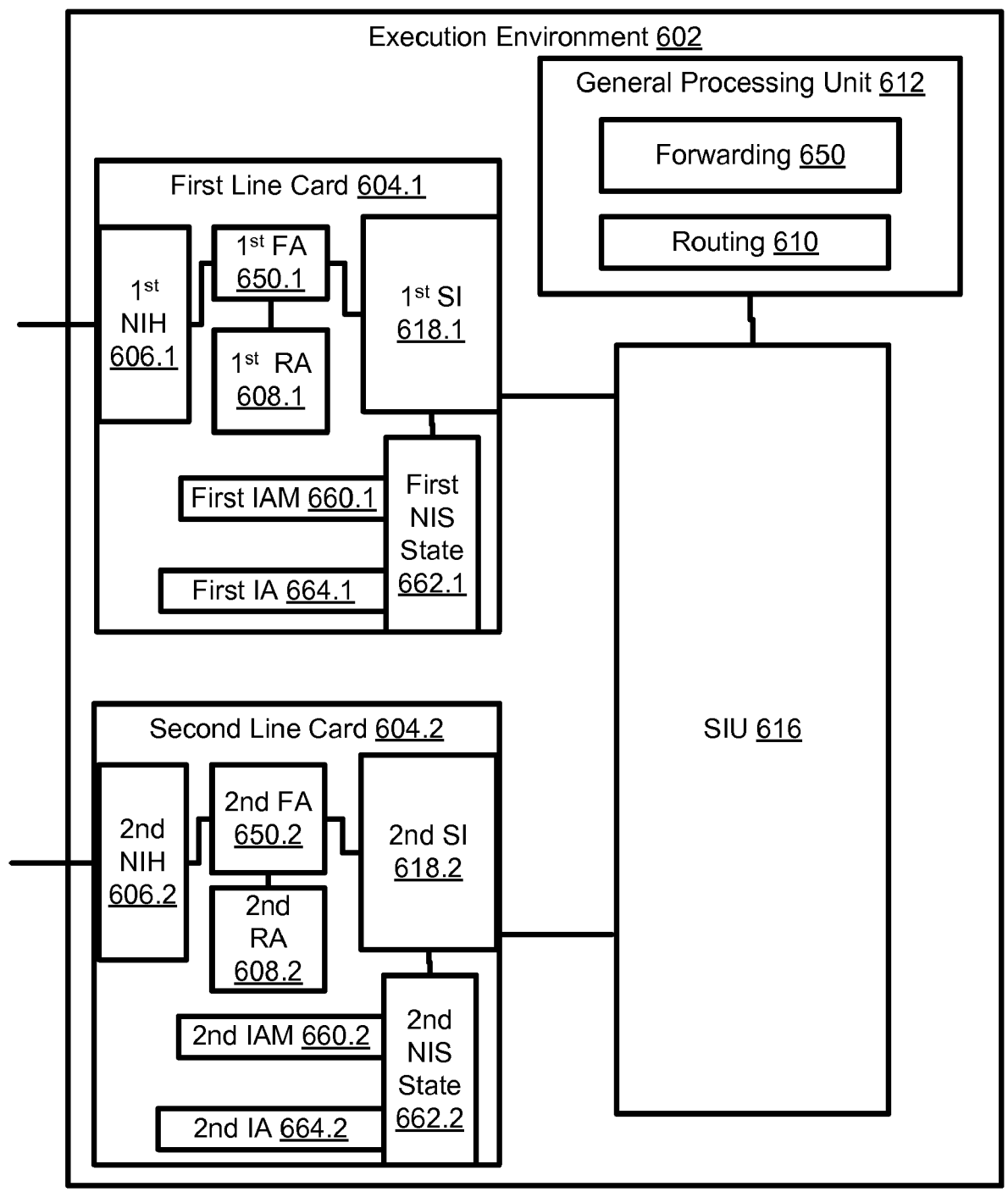
FIG. 6 is block a diagram illustrating an arrangement of components for enabling an operative coupling to a network according to another aspect of the subject matter described herein.

Components illustrated in FIG. 3b may be adapted for performing the method illustrated in FIG. 2b in a number of varying execution environments. FIG. 4 and FIG. 6 illustrate block diagrams including adaptations of the arrangement of components in FIG. 3b and/or analogs of the components of FIG. 3b adapted for operation, respectively, in execution environment 402 and in execution environment 602 including and/or otherwise provided by one or more nodes. The method depicted in FIG. 2b may be carried out by some or all of the exemplary components and/or their analogs.

FIG. 1 illustrates key components of an exemplary device that may at least partially provide and/or otherwise be included in an execution environment, such as execution environment 402 in FIG. 4, execution environment 502 in FIG. 5, and execution environment 602 in FIG. 6. The components illustrated in FIG. 4, FIG. 5, and FIG. 6 may be included in or otherwise combined with the components of FIG. 1 to create a variety of arrangements of components according to the subject matter described herein.

Figure 7:
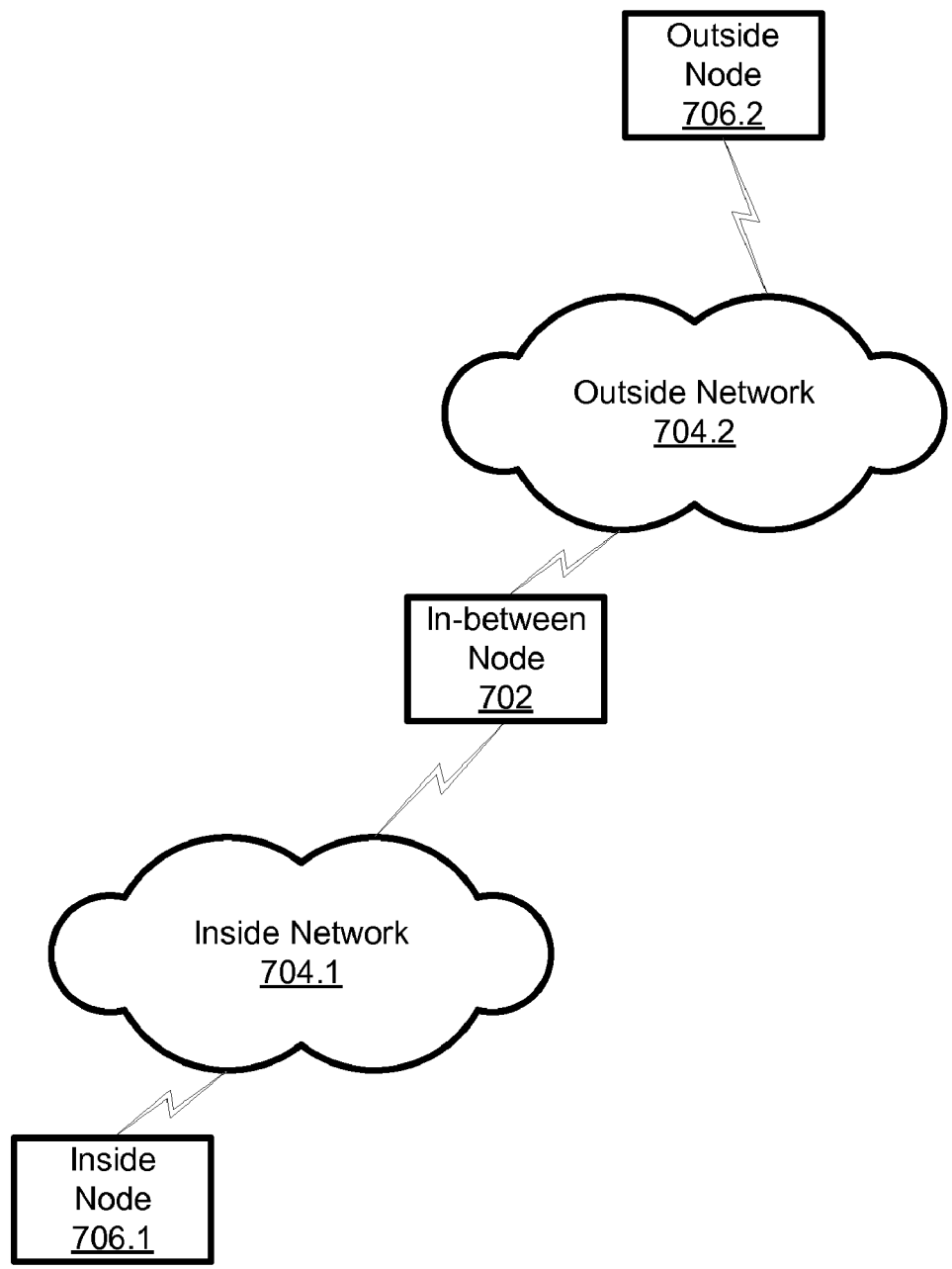
FIG. 7 is a network diagram illustrating an exemplary system for disabling an operative coupling to a network according to an aspect of the subject matter described herein and illustrating an exemplary system for enabling an operative coupling to a network according to another aspect of the subject matter described herein.

FIG. 7 illustrates in-between node 702 as an exemplary network relay. In-between node 702 includes a device included in and/or otherwise adapted for providing an execution environment such as illustrated in FIG. 4, FIG. 5, and/or FIG. 6. In-between node 702 in FIG. 7 includes a first network interface hardware component and a second network interface hardware component. In-between node 702 may be operatively coupled to a first network, illustrated as inside network 704.1 via the first network interface hardware component when a first operative coupling of the first network interface hardware component to the first network is enabled, and may be operatively coupled to a second network, illustrated as outside network 704.2 when a second operative coupling of the second network interface hardware component to the second network is enabled. When both operative couplings are enabled, in-between node 702 may forward data exchanged between a first node, illustrated by inside node 706.1 in inside network 704.1, and a second node, illustrated by outside node 706.2 in outside network 704.2. Either or both inside network 704.1 and outside network 704.2 may include and/or may be included in a local area network (LAN), an intranet, at least a portion of the Internet and/or other wide area network (WAN).

FIG. 4 illustrates execution environment 402 that may include and/or may be included in a network node such as in-between node 702 in FIG. 7. In FIG. 4 execution environment 402 includes first network interface adapter (NIA) component 404.1, as a network interface component, including a first network interface hardware (NIH) component 406.1 for operatively coupling in-between node 702 to inside network 704.1. Execution environment 402 also includes second NIA component 404.2 including second NIH component 406.2 for operatively coupling in-between node 702 to outside network 704.2. When in-between node 702 is operatively coupled to inside network 704.1 via first NIA component 404.1, first NIA component 404.1 may receive data transmitted by inside node 706.1 via inside network 704.1 and/or may send data to inside node 706.1 via inside network 704.1. Execution environment 402 may optionally include one or more other NIA components illustrated by third NIA component 404.3 through an Nth NIA component 404.n including corresponding NIH components, illustrated by third NIH component 406.3 through $N^{th}$ NIH component 406.n.

Exemplary network interface components may include and/or may be included in network interface controllers, network interface cards, network interface adapters, line cards, modem ports, or other type of network physical layer components. FIG. 4 illustrates first NIA component 404.1 includes first NIH component 406.1 physically coupling in-between node 702 in FIG. 7 to a physical communications medium in inside network 704.1. A physical communications medium may be wired or wireless. In FIG. 4, second NIA component 404.2 includes second NIH component 406.2 physically coupling in-between node 702 to a physical communication medium in outside network 704.2. The communication media of inside network 704.1 and outside network 704.2 may be the same or different types of communication media.

NIA components 404 in FIG. 4 include at least a portion of a link layer 408 for communicating over respective physical communications media. In FIG. 4, link layer 408 is shown as the same for first NIA component 404.1 and second NIA component 404.2. In an aspect, link layer 408 may include a first link layer component for communicating over a physical communications medium in inside network 704.1 via first NIH component 406.1 in first NIA component 404.1, and may further include a second link layer component for communicating over a second communication medium of outside network 704.2 via second NIH component 406.2 in second NIA component 404.2. The first and second link layer components may support the same or different link layer protocols.

FIG. 4 illustrates network layer 410 corresponding to layer 3 of the open systems interconnection reference (OSI) model. The Internet Protocol (IP) is an exemplary layer 3 or network layer protocol. FIG. 4 includes routing layer 412 for identifying a network interface component to transmit data received from another network interface component in execution environment 402. Data communicated between inside node 706.1 and outside node 706.2 may be received by one of first NIA component 404.1 and second NIA component 404.2 via one of first NIH component 406.1 and second NIH component 406.2, respectively. Link layer data is detected by link layer 408 according to a link layer protocol supported. For example, Ethernet frames may be detected when received via a CAT 6 Ethernet cable. Link layer data is provided to network layer 410 according to the specification of a particular network layer. For example, one or more IP packets may be detected in one or more received Ethernet frames. Routing layer 412 may determine a network interface component for transmitting the data to communicate the received data between networks 704 operatively coupled by in-between node 702.

FIG. 5 illustrates another exemplary execution environment 502 that may include and/or otherwise be provided by in-between node 702 and/or an analog. In FIG. 5 execution environment 502 includes first line card 504.1 as a network interface component. First line card 504.1 includes first NIH component 506.1 for physically and operatively coupling in-between node 702 to inside network 704.1. Execution environment 502 also includes second NIH component 506.2 in second line card 504.2 for physically and operatively coupling in-between node 702 to outside network 704.2.

Data communicated between inside node 706.1 and outside node 706.2 may be received by one of first line card 504.1 and second line card 504.2 in a manner analogous to that described above with respect to NIA components 404 in FIG. 4. At least a portion of the data may be communicated to general processing unit (GPU) 508 via internal communications medium 514 for determining a line card for sending at least a portion of the received data for forwarding to the receiving node. For example, first NIH component 506.1 in first line card 504.1 may receive data transmitted over inside network 704.1 to outside node 706.2 from inside node 706.1. GPU 508 may interoperate with routing component 510 to identify second line card 504.2 for transmitting the data received from inside node 706.1 to outside node 706.2 via outside network 704.2. GPU 508 may further interoperate with forwarding component 550 to configure internal communications medium 514 for delivering the received data from first line card 504.1 to second line card 504.2 for transmitting by second NIH component 506.2. Internal communications medium 514 may include any suitable communications medium including a bus, a switch interconnect unit, and other media described with respect to bus 116 in FIG. 1

In FIG. 5 GPU 508 may include routing component 510 or they may be separate components. In an aspect, routing component 510 may manage one or more policies and/or may manage one or more routing tables. A routing table may be generated and updated based on one or more metrics associated with network paths (i.e. routes) in a network. Exemplary metrics include metrics based on network path length, dropped packets, delay, and bandwidth. A metric may consist of any value that may be used to determine whether a route in a network should perform better than another route in the network according to some requirement and/or criterion. For example, a routing algorithm may use a metric for determining whether a route in a network has fewer hops than another route in the network. A number of routing protocols exist for providing a metric associated with identifying a network interface component for forwarding received data.

Alternatively or additionally, various protocols are suitable for providing information for policy evaluation and/or for identifying a routing metric for generating and updating a routing table. For example, link state protocols such as the Open Shortest Path First (OSPF), distance vector protocols such as the Routing Information Protocol (RIP), path vector protocols such as the Border Gateway Protocol (BGP), and label switching protocols such as Multi-protocol Label Switching (MPLS) may be used. Both OSPF and RIP message formats support a message area for one or more metrics. In an aspect, in-between node 702 may exchange routing metric information with other network relays. The exchanged information allows in-between node 702 to identify a portion of a network path to a destination host for communicating data between inside network 704.1 and outside network 704.2. In an aspect, BGP allows in-between node 702 to advertise paths to reach a destination in an operatively coupled network. In-between node 702, having such information, may apply one or more policies associated with one or more nodes included in the portion of the network path.

A policy for routing and/or otherwise forwarding information received by in-between node 702 may be based on the size of the packet, the protocol of the payload, and/or some other attribute. It may also be based on a combination of attributes. In MPLS, labels (and thus routes) are determined by a packet's forwarding equivalence class (FEC). An FEC may be defined based on a route associated with a node in a network path to a destination in inside network 704.1 and/or a destination in outside network 704.2.

Routing component 510 may evaluate a policy and/or maintain a routing table. A routing table may be maintained based on a routing metric. When routing component 510 is configured for evaluating a policy, the policy may be based on routing information provided by GPU 508.

According to an aspect, forwarding data may include identifying a network interface component for forwarding by performing a routing policy operation on a routing policy based on a determined routing metric. For example, forwarding component 550 may be configured for performing a routing policy operation on a routing policy based on a determined routing metric for identifying a line card 504. As discussed above, the routing policy operation on a routing policy may include an evaluation of the routing policy. As such, forwarding component 550 may be configured for identifying the line card for transmitting the data based on an evaluation of a policy based on the routing metric. Forwarding component 550 may retrieve a routing policy from routing component 510 for evaluation. The policy may be retrieved based on any information in data for forwarding such as a packet, a network path for communicating data, a network node included in the network path for communicating data, geospatial information, a routing indicator, and other information as required for forwarding data between inside node 706.1 and outside node 706.2 by in-between node 702.

In another aspect, identifying forwarding data may include performing a routing table operation on a routing table. For example, forwarding component 550 may be configured for performing a routing table operation on a routing table for identifying a line card 504. As discussed above, a routing table operation on a routing table may include a routing table lookup. Forwarding component 550 may identify a line card 504 for transmitting received data over a destination network path by performing a lookup operation on routing table or other lookup table. For example, forwarding component 550 may provide packet information such as some or all of a network address of the destination host to the routing component 510 for performing a lookup in a routing table maintained by routing component 510. The lookup results may be returned to the forwarding component 550.

Based on the results of the policy evaluation and/or the results of the lookup operation, forwarding component 550 identifies a line card 504 of in-between node 702 for transmitting from one of inside network 704.1 and outside network 704.2 to the other.

FIG. 6 illustrates still another exemplary execution environment 602 that may include and/or otherwise be provided by in-between node 702 and or an analog. In FIG. 6 execution environment 602 includes first NIH component 606.1, in first line card 604.1, for physically and operatively coupling in-between node 702 to inside network 704.1. Execution environment 602 also includes second NIH component 606.2, in second line card 604.2, for physically and operatively coupling in-between node 702 to outside network 704.2.

Execution environment 602 may be an adaption and/or analog of execution environment 502 and operate as described with additional components adding additional capabilities. According to an aspect illustrated in FIG. 6, in-between node 702 may include the additional components illustrated for enhancing its operation. Each line card or network interface component of in-between node 702 may include a routing agent (RA) component. FIG. 6 illustrates first RA component 608.1 included in first line card 604.1, and second RA component 608.2 in second line card 604.2 A RA component may be included for distributing the operation of routing component 610, offloading the work of the routing component 610 and reducing traffic flow between line cards 604 and GPU 612. A RA component 608 may operate as a cache maintaining a portion of a routing table maintained by routing component 610 and performing lookups locally in the including line card 604.

In FIG. 6, forwarding component 650 may configure switch interconnect unit (SIU) 616 to provide a communication channel from first line card 604.1 to second line card 604.2 and vice versa, as needed. Each line card 604 may include a switch interface (SI) component 618 for writing data to a channel configured in SIU 616 and/or for reading data from a channel. A forwarding agent (FA) component 650.1, such as first FA component 650.1, may identify the destination network interface component, such as second line card 604.2, for transmitting data received in a communication including inside node 706.1 and outside node 706.2. First SI component 618.1 of first line card 604.1 may setup a channel for communicating the data to second SI component 618.2 of second line card 604.2. Second SI component 618.2 may read the data and provide the data to second NIH component 606.2 for transmitting. An FA component optionally interoperating with an associated RA component may modify the transmission of the data based on a policy and/or routing table information stored in an including line card 604. For example, second FA component 650.2 interoperating with second RA component 608.2 may alter a network path including a next hop to be traversed by received data to provide the data to second NIH component 604.2 for transmitting. Second FA component 650.2 may identify yet another network interface component for transmitting the data or may interoperate with the forwarding component 650 to identify another network interface component and/or confirm the network interface component identified by first FA component 650.1.

Each line card 606 in execution environment 602 including first line card 606.1 and second line card 606.2 may include a forwarding agent (FA) component 650.2. A FA component may be provided for interoperating with an associated RA component 608 (described above) analogous to the manner that forwarding component 650 interoperates with the routing component 610 for identifying a network interface component for transmitting received data from one network to another. A FA component provides distributed operation of forwarding component 650 by offloading the work of forwarding component 650 and reducing traffic flow between line cards 604 and GPU 612. A FA component may operate, as indicated above, with an RA component 608 for evaluating a policy and/or performing a routing table lookup in a line card 604 of received data. If a line card 604 for transmitting received data is identified, GPU 612 and its components need not be involved in identifying the line card 604. A line card 604, in such cases, may play the role of a general processing unit hosting its own forwarding agent (FA) and routing component agent (RA). In FIG. 6, first FA component 650.1 is illustrated in first line card 604.1 and second FA component 650.2 is illustrated in second line card 604.2.

A network interface component in in-between node 702 may receive data communicated from a sending node 706 via a network path included in a network 704 operatively coupled to in-between node 702 via a network interface hardware component. One or more network paths may exist for transmitting the data. The sending node 706 may be and/or otherwise may include a desktop PC, a notebook, a server, or a handheld computing device serving as a gateway, bridge, or other network relay device. In-between node 702 may be configured for receiving the data from a sending node 706 and for transmitting the received data to a receiving node 706 at any protocol layer. For example, in-between node 702 may receive and transmit a data packet at a link layer as performed by an Ethernet bridge and a multiple protocol labeling switch (MPLS). Further, in-between node 702 may receive and transmit a data packet at a network layer as performed by an Internet protocol (IP) router. Further, in-between node 702 may receive and transmit a data packet at a transport layer as performed by a proxy for forwarding a packet from a first TCP connection to a second TCP connection. Further, in-between node 702 may receive and transmit a data packet at a session layer as performed by a hypertext transmission protocol (HTTP) proxy for forwarding an HTTP message associated with session information from a first HTTP connection to a second HTTP connection. Further, in-between node 702 may receive and transmit a data packet at a presentation layer, an application layer, a physical layer as performed by a repeater, across protocol layers as performed by a protocol gateway, and/or across an intervening network as performed by a protocol tunneling service.

As described above, in-between node 702 may be configured for receiving and for transmitting data at any protocol layer. Accordingly, data may be included in and/or may include data formatted according to a physical layer protocol, a link layer protocol, a network layer protocol, a transport layer protocol, a session layer protocol, a presentation layer protocol, and/or an application layer protocol.

With reference to FIG. 2, block 250 illustrates the method includes forwarding first data received for forwarding between a first node in a first network and a second node in a second network by a network relay via a first operative coupling to the first network of a first network interface hardware component in the network relay and via a second operative coupling to the second network of a second network interface hardware component in the network relay. Accordingly, a system for disabling an operative coupling to a network includes means for forwarding first data received for forwarding between a first node in a first network and a second node in a second network by a network relay via a first operative coupling to the first network of a first network interface hardware component in the network relay and via a second operative coupling to the second network of a second network interface hardware component in the network relay. For example, as illustrated in FIG. 3a, forwarding component 350 is configured for forwarding first data received for forwarding between a first node in a first network and a second node in a second network by a network relay via a first operative coupling to the first network of a first network interface hardware component in the network relay and via a second operative coupling to the second network of a second network interface hardware component in the network relay.

FIG. 4 and FIG. 5 illustrate forwarding component 450 and forwarding component 550 as adaptations and/or analogs of forwarding component 350 in FIG. 3a. One or more forwarding components 450 operate in execution environment 402, and one or more forwarding components 550 operate in execution environment 502.

In various adaptations, in-between node 702 in FIG. 7 may include and/or may be included in a modem (e.g. DSL and/or cable), a gateway, a router, a switch, a hub, a bridge, a repeater, a firewall, a network address translation (NAT) service, a virtual private network (VPN) concentrator, a demilitarized zone (DMZ) gateway, a desktop computer, a server, a mobile computer, and/or a device included in a network tunnel. For example, the arrangement of components in FIG. 4 may operate as an internet router at a network layer and as a bridge or switch at a link layer. The arrangement components in FIG. 5 and/or the arrangement in FIG. 6 may operate as a router, a link layer switch, and/or a bridge in various aspects.

A first network and/or a second network operatively coupled to a network relay may include one or more local area networks (LANs), wide area networks (WANs), virtual private networks (VPNs), point-to-point links, internets, voice communications networks, and/or video communications networks. A first network and/or a second network operatively coupled to a network relay may include a wireless network and/or a wired network.

In FIG. 4 forwarding component 450 may receive and/or otherwise detect data for forwarding between inside node 706.1 and outside node 706.2. The data may be received for routing by routing layer 412. Either node 706 may be a sender of data and/or a receiver of data in a communication. In an aspect, forwarding component 450 may receive data for forwarding between the nodes 706 by receiving data from inside network 704.1 and/or outside network 704.2. Not all data received by a network relay device may be data for forwarding. Received data meeting a forwarding condition may be identified as data for forwarding.

Data for forwarding may be detected and/or otherwise identified by receiving the data via an operative coupling of a network interface hardware component to a network. A determination may be made whether a forwarding condition for the received data is met. If the forwarding condition is determined to be met, the received data may be detected as data for forwarding, in response to the determination.

In one aspect, a forwarding condition may include and/or otherwise identify a forwarding criterion. Determining that the forward condition is met may include determining whether one or more attributes of the received data match the forwarding criterion. A forwarding criterion may be specified for matching one or more attributes of received data that may be based on, for example, the first network, the second network, the first node, the second node, a protocol for at least one of sending and receiving the received data, at least one of an application sending the received data and an application identified as a recipient of the received data, a user identified with the received data, a node in a network path in a route in communicating the received data, a type of at least a portion of the received data, a pattern included in the received data, a value included in the received data, a geospatial location of a node included in communicating the received data, a sender of the received data, a receiver of the received data, and/or a relationship between a sender of the received data and a receiver of the received data.

In an aspect, a forwarding condition may specify that all data communicated between inside network 704.1 and outside network 704.2 meets the forwarding condition. In another example, a specified forwarding condition may be met for data received from a particular network interface component and not met for data received from another network interface component. For example, data received via first line card 504.1 may meet a forwarding condition while data received via second line card 504.2 may not meet the forwarding condition.

In still another example, a forwarding condition may be specified that is met for particular nodes, particular applications, particular networks, and particular data. For example, a forwarding condition may be met for data communicated by inside node 706.1 with any node in outside network 704.2 where inside node 706.1 initiated the communication. Data received in communication(s) between other nodes in inside network 704.1 and corresponding nodes in outside network 704.2 may not meet the forwarding condition.

A forwarding condition may be met for data communicated according to a particular protocol, such as HTTP and/or simple mail transfer protocol (SMTP). A forwarding condition that is met for certain protocols and/or TCP/UDP port numbers exemplifies a forwarding condition that may identify data for forwarding by one or more particular applications and/or types of applications.

Various forwarding conditions may be specified in various adaptations of the arrangement in FIG. 3. For example, a forwarding condition may be specified that is based on a protocol for communicating received data, a network address or a portion of a network address, a port number, an attribute and/or content of a payload portion of a packet, at least a portion of a header of a packet, at least a portion of a footer of a packet, at least a portion of a name in a network naming domain, a geospatial location of a node in a path included in at least a portion of the first network and the second network, at least one of a format and vocabulary of data in a communication as specified by a particular protocol, a user, a group, a security attribute, a distance between a node in the first network and a node in the second network included in a communication (e.g., a geographic distance, a distance in network path hops, a time distance, and/or a relationship distance), an owner of a node in a network path, an administrative authority of a node in a network path, a measure of trust associated with a node in a path in a communication, a cost associated with a communication, an attribute of a legal agreement, and a quality of service attribute.

In an aspect, forwarding component 450 may receive data in an IP packet for routing. The IP packet includes network address information of the nodes 706 in the sender and receiver locations in each packet. Forwarding component 450 may detect full network addresses and partial network addresses, known as scoped network address in IP networks, as identifiers of the nodes 706. Routing layer component 412 may provide some or all of the network address information to forwarding component 450. Based on the network addresses and port numbers forwarding component 450, in the aspect, may determine the packet is routable between a node in inside network 704.1 and outside network 704.2 via first NIA component 404.1 and second NIA component 404.2, respectively. In another aspect, in-between node 702 may be an application relay device. Forwarding component 450 may forward data received for forwarding based on a port number of a sending and receiving application and/or on information accessible in an application protocol according to which the data is transmitted via inside network 704.1 and/or outside network 704.2.

In another aspect, forwarding component 450 may forward data received for forwarding between inside network 704.1 and outside network 704.2 without identifying any particular node in inside network 704.1 and/or any particular node in outside network 704.2. For example, in-between node 702 may host an asynchronous transfer mode (ATM) switch. Forwarding component 350 may be adapted to forward data in an ATM cell based on an identified virtual circuit.

In another aspect, forwarding data may include receiving data according to a first protocol and transmitting some or all of the data according to a second protocol. For example, forwarding component 450 may be adapted to operate as a gateway between inside network 704.1 and outside network 704.2 mapping communications via a first network protocol supported by inside network 704.1 to a second protocol supported by outside network 704.2. The two protocols may include different network address spaces. Forwarding component 450 may map network addresses and/or portions of network addresses from a first address space of the first protocol to a second address space of the second protocol and vice versa in forwarding data between inside network 704.1 and outside network 704.2.

In various aspects, forwarding data may include receiving and sending the data via at least one of a link layer protocol, a network layer protocol, a transport layer protocol, a session layer protocol, a presentation layer protocol, and/or an application layer protocol. In an adaption, at least a portion of a forwarding component may be included in one or more NIA components 404, and/or in link layer 408. As described above, alternative arrangements of components illustrated in FIG. 3 may forward data for forwarding between inside network 704.1 and outside network 704.2 at other layers of a network stack, such as a transport layer. Adaptations and/or analogs of forwarding component 350 may operate at least partially in any layer of a network stack provided by various adaptations and/or analogs of in-between node 702.

Forwarding data may include forwarding data in a connection-oriented communication and/or in a connectionless communication. Exemplary protocols operating at various layers of the OSI model supporting connection-oriented and/or connectionless communication include Ethernet, token-ring, ATM, FDDI, TCP, IP, NetBIOS, IPX, frame-relay, FTP, UDP, and HTTP. In an aspect, forwarding data may include forwarding data received by a publish-subscribe service. For example, in-between node 702 may host a presence service. An adaption of forwarding component 350 in FIG. 3 may receive a publish message from inside node 706.1 and send or forward data in the publish message in a notification message to outside node 706.2 and/or outside node 706.2 may send a publish message and inside node 706.1 may receive a notification including forwarded information.

In an aspect, a forwarding component may forward data sent asynchronously from inside node 706.1 to outside node 706.2 and/or vice versa. Alternatively or additionally, the forwarding component may forward data included in a request-response communication between inside node 706.1 and outside node 706.2.

FIG. 5 illustrates forwarding component 550 including GPU component 508, and routing component 510. Forwarding component 550 may control routing and forwarding of data between line cards 504 in execution environment 502. As with forwarding component 450, forwarding component 550 may be configured, in various aspects and adaptations, to forward data between a node in inside network 704.1 and a node in outside network 704.2 with varying degrees of specificity based on one or more configured forwarding conditions.

In one aspect, forwarding component 550 may include a counter to track communication between inside network 704.1 and outside network 704.2 with or without identifying nodes in various exchanges of data. In another aspect, forwarding component 550 may provide routing component 510 with network addresses to maintain a table of active nodes exchanging data between inside network 704.1 and outside network 706.2.

Returning to FIG. 2, block 252 illustrates the method further includes determining a specified decoupling condition is met. Accordingly, a system for disabling an operative coupling to a network includes means for determining a specified decoupling condition is met. For example, as illustrated in FIG. 3a, forwarding monitor component 352 is configured for determining a specified decoupling condition is met.

FIG. 4 and FIG. 5 illustrate forwarding monitor component 452 and forwarding monitor component 552 as adaptations and/or analogs of forwarding monitor component 352 in FIG. 3a. One or more forwarding monitor components 452 operate in execution environment 402, and one or more forwarding monitor components 552 operate in execution environment 502

In an aspect, determining a decoupling condition is met may include detecting an idle period during which no data for forwarding is received by a network relay via a first operative coupling to a first network and/or via a second operative coupling to a second network. For example, various adaptations of forwarding monitor component 352 in FIG. 3, such as forwarding monitor component 452 in FIG. 4, and forwarding monitor component 552 in FIG. 5, may detect one or more idle periods of no communication between inside network 704.1 and outside network 704.2; between particular nodes, such as inside node 706.1 and outside node 706.2; between particular applications identified, for example by port numbers and/or information in a application protocol; and/or between a node in inside network 704.1 and a node in outside network 704.2.

Detecting an idle period may include configuring an idle indication to be sent and/or generated. When the indication is received, the idle indication indicates an idle period during which no data for forwarding has been received. The idle indication may be configured along with forwarding received data. The idle indication may be configured during and/or in response to forwarding data between a first and second network by a network relay operatively coupling the first network and the second network. A decoupling condition may be determined and/or otherwise detected to be met, in response to receiving an idle indication for an idle period.

A time period corresponding to an idle period may be measured and/or otherwise detected by counting one or more events that occur in time. Configuring an idle indication to be received may include accessing a value from an event counter. An event count may be accessed to, for example, determine a current time as a start time for an idle period and/or to reset an event counter to initialize a count of one or more events. An idle indication may be received and/or otherwise detected by determining that a value of an event counter meets a threshold condition specified for detecting an idle period. Any detectable event may be counted to detect and/or measure an idle time period. Exemplary events that may be counted via accessing an event counter include, timer interrupts, instructions executed by an IPU, IPU cycles, bytes received via a network, bytes transmitted via a network, messages received, messages transmitted, and/or messages forwarded. A message may be defined as a unit of data communicated via a network at a particular network layer. An IP packet is message at the IP layer of a TCP/IP network, for example.

In FIG. 4, forwarding monitor component 452 may include and/or otherwise interoperate with one or more timer components 414, directly and/or indirectly. Forwarding monitor component 452 may set a timer 414 after and/or during forwarding of data between inside node 706.1 and outside node 706.2 via a NIA component 404. If the timer 414 expires before additional data for forwarding is received via a NIA component 404, forwarding monitor component 452 may detect an idle period.

When data for forwarding is received, forwarding monitor component 452 in FIG. 4 may reset a timer 414 for detecting an idle period. The duration of the reset timer 414 may be set to a configured fixed value and/or may vary according to a direction of transmission between the inside network 704.1 and the outside network 704.2, an identifier and/or other attribute of a sending node and/or a receiving node, and/or any other attribute accessible within the execution environment of in-between node 702, such as exemplary execution environment 402 in FIG. 4 and execution environment 502 in FIG. 5. If no data for forwarding is received according to a forwarding condition, the timer 414 is not reset. Forwarding monitor component 452 may detect an expiration of the timer indicating an idle period. In response to detecting the timer expiration, forwarding monitor component 452 may determine that a decoupling condition is met.

In FIG. 5, first forwarding monitor 552.1 may be configured according to a forwarding condition to reset an event counter for detecting an idle period for data received via first NIH component 506.1 for relaying to second NIA component 504.2 to transmit to a node in outside network 704.2. In the example, second forwarding monitor component 552.2 may be configured according to the forwarding condition to not reset an event counter for detecting an idle period for data received via second line card 504.2 for relaying to first line card 504.1 to transmit to a node in inside network 704.1. Data received via second NIH component 506.2 may and/or may not be transmitted to a node in inside network 704.1 in various adaptations and configurations of a network relay.

In yet another aspect, forwarding monitor component 452, in FIG. 4, may detect one or more idle periods during which no data is received via an SMTP message between one or more mail clients in one or more nodes in inside network 704.1 and a mail server in outside network 704.2 specified in a forwarding condition. In FIG. 5, first forwarding monitor component 552.1 in first line card 504.1 may detect packets received from inside network 704.1 including a destination port number with a value of "80" in a TCP header portion of the received data. A forwarding condition specified for web browsers may be met based on identifying port number "80" in the TCP header. First forwarding monitor component 552.1 may start a timer (not shown) in response to receiving the data including the TCP header from inside network 704.1. The data may be routed to second line card 504.2 for transmitting to a node, such as outside node 706.2 in outside network 704.2 by second NIH component 506.2.

In an aspect more than one timer and/or other event counter may be active at the same time. In various aspects, a decoupling condition may be met when particular timers and/or other event counters meet corresponding threshold conditions and/or a decoupling condition may be met when various combinations of event counters meet corresponding threshold conditions. For example, first forwarding monitor component 552.1 may be configured to detect a first idle period having a first duration based on a first forwarding condition that matches data received by first NIH component 506.1 from inside network 704.1 addressed to a node in outside network 704.2. Additionally, second forwarding monitor component 552.2 may be configured to detect a second idle period having a second duration based on a second forwarding condition that matches data received by second NIH component 506.2 from outside network 704.2 addressed to a node in inside network 704.1. In one aspect, a decoupling condition is determined to be met by the forwarding monitor components 552 when both the first and second idle periods are detected. In another aspect, either forwarding monitor component 552 may determine a decoupling condition is met in response to detecting either of the first idle period or the second idle period.

In an aspect, a forwarding condition and/or a decoupling condition may be specified in one or more instructions in an adaption of forwarding monitor component 352 in FIG. 3 and/or in another component interoperating with a forwarding monitor component. For example, one or both forwarding monitor components 552 in FIG. 5 may include machine code generated from source specifying part or all of a forwarding condition and/or a decoupling condition in a programming language.

In addition to or instead of detecting an idle period, determining a decoupling condition is met may be determined by, for example, detecting a specified time, detecting an identified node is operatively coupled to at least one of the first network and the second network (e.g., such as node infected with a virus), detecting an identified node is not operatively coupled to at least one of first network and the second network, detecting that an identified application is not active in a node in at least one of the first network and the second network, and/or determining that data received for forwarding matches a specified decoupling matching criterion, In various aspects, a decoupling condition may be based on an attribute of the first network, the second network, the first node, the second node, a protocol included in communicating data for forwarding, an application included in communicating data for forwarding, a user included in communicating data for forwarding, a node in a network path in a route in communicating data for forwarding, a type of at least a portion of data received by a network relay, a pattern included in data received by a network relay, a value included in data received by a network relay, a geospatial location of a node included data received by a network relay, a sender of data received by a network relay, a receiver of data forwarded by a network relay, and/or a relationship between nodes operatively coupled by a network relay.

In an aspect, one or both forwarding monitor components 552 may determine a decoupling condition is met in response to detecting one and/or both nodes have ceased participation in a data exchange and/or are in the process of ending their participation. For example, first forwarding monitor component 552.1 may detect an indication via first NIH component 506.1 that inside node 706.1 has left the network. Inside node 706.1 may include a network interface component operatively coupled to the same LAN as first line card 504.1, in an aspect. Inside node's 706.1 network interface component may generate an error signal on the LAN. Inside node's 706.1 network interface component may send beacon frames before removing itself from the LAN.

In another example, inside node 706.1 may send a message to a dynamic host configuration protocol (DHCP) server to release its assigned network address. A WINDOWS® internet name server (WINS server) may determine that inside node 706.1 has left inside network 704.1. In various scenarios, such as the examples just described, in-between node 702 may receive a notification via an included network interface component, such as first line card 504.1 in FIG. 5. First forwarding monitor component 552.1 may detect the notification via interoperation, direct and/or indirect, with first line card 504.1. Alternatively or additionally, first forwarding monitor component 552.1 and/or another component in execution environment 502 may send a message to one or more of inside node 706.1, the DCHP server, the WINS server, and/or other node that tracks the status of inside node 706.1 on inside network 704.1. First forwarding monitor component 552.1 may detect whether inside node 706.1 is operative in first network or not based on one or more responses to one or more messages. One or both forwarding monitor components 552 may determine a decoupling condition is met in response to detecting inside node 706.1 and/or other nodes have left inside network 704.1 and/or outside network 704.2 according to the specification of the particular decoupling condition.

In another aspect, inside network 704.1 may include a plurality of networks. In-between node 702 may include a plurality of network interface components, as illustrated by NIA components 404 in FIG. 4, operatively coupling in-between node 702. In-between node 702 may include NIA components 404 operatively coupled to two or more networks included in inside network 704.1. In-between node 702 may determine a decoupling condition is met for communication between inside network 704.1 and outside network 704.2 and continue to forward data between and/or among the multiple networks included in inside network 704.1.

In still another aspect, determining a decoupling condition is met may be in response to receiving one or more messages indicating an end of one or more communications. A message indicating the end of a communication may be received, for example by any NIH component 506 in FIG. 5 from a node either or both of inside network 704.1 and outside network 704.2. For example, inside node 706.1 may send a message to in-between node 702 to block communication with outside node 706.2. For example, in-between node 702 may include and/or otherwise interoperate with a firewall. A forwarding monitor component 552 may be invoked in response to the message to determine that a decoupling condition is met. The message may include no data for forwarding between the inside network 704.1 and the outside network 704.2.

In still another aspect, inside and outside nodes 706 may communicate via a TCP connection. Either or both inside node 706.1 and outside node 706.1 may send a message to close and/or otherwise end the connection. Forwarding monitor component 452 in FIG. 4 may identify the message based on a decoupling criterion for matching TCP close indications. The message includes data to be forwarded between the inside node 706.1 and the outside node 706.2. Forwarding component 450 forwards the data.

A decoupling condition may be met when a particular node in inside network 704.1 and/or outside network 704.2 ends a communication and/or leaves a network. In another aspect, a decoupling condition may be met when all nodes in a specified group, that may be determined, based on a forwarding condition, have ended communication, and/or left a network. A decoupling condition may be met when a communication ends that includes sending data via a particular protocol, to and/or from a particular port, and/or based on various other detectable attributes of data exchanged between a first network and the second network via a network relay.

In yet another aspect, determining a decoupling condition is met may be based on a specified time. For example, a household and/or business may configure a decoupling condition based on a time. In a small business with nodes in inside network 704.1, access to a second network may be restricted to times when a particular service operating in a node in the second network is known to be available. A decoupling condition may be met at specified times on, for example week days, and may be configured to be met at all times on weekends and holidays. A household with a first network operating including a cable or DSL modem as a network relay for accessing the Internet may have decoupling condition that is met when members of the household are not present and/or asleep. This may be configured based on particular times and/or may be detected by sensors in exterior entrances of a home, light sensors, and the like. A first network interface hardware component remains active to allow communication between and/or among nodes in a first network that may and/or may not have human users.

Returning to FIG. 2, block 254 illustrates the method yet further includes, subsequent to forwarding the first data and in response to determining the decoupling condition is met, disabling the second operative coupling while the first operative coupling remains enabled for receiving second data for forwarding. Accordingly, a system for disabling an operative coupling to a network includes means for, subsequent to forwarding the first data and in response to determining the decoupling condition is met, disabling the second operative coupling while the first operative coupling remains enabled for receiving second data for forwarding. For example, as illustrated in FIG. 3a, network interface director component 354 is configured for, subsequent to forwarding the first data and in response to determining the decoupling condition is met, disabling the second operative coupling while the first operative coupling remains enabled for receiving second data for forwarding.

FIG. 4 and FIG. 5 illustrate network interface director component 454 and network interface director component 554 as adaptations and/or analogs of network interface director component 354 in FIG. 3a. One or more network interface director components 454 operate in execution environment 402, and one or more network interface director components 554 operate in execution environment 502

Various aspects and adaptations of network interface director component 354 in FIG. 3, such as network interface director component 454 in FIG. 4, and network interface director component 554 in FIG. 5, may disable an operative coupling between a network interface hardware component and a network in any manner. Communication between and/or among nodes 706 in first network may continue. In contrast, firewalls block communication received via a network interface hardware component that is operatively coupled to a physical communications medium.

In an aspect, disabling an operative coupling of a network interface hardware component to a network may include reducing power to the network interface hardware component. In FIG. 4, network interface director component 454 is included in link layer 408 and manages the operative coupling between second NIH component 406.2 and outside network 704.2. Network interface director component 454 may optionally manage the operative coupling between first NIH component 406.1 and inside network 704.1. Network interface director component 454 may be instructed by forwarding monitor component 452 and/or otherwise detect that a decoupling condition has been determined to be met. In response, network interface director component 454, in an aspect, may interoperate with a power management component 416 in execution environment 402 in second NIA component 404.2 and/or external to second NIA component 404.2 to cut power off and/or otherwise reduce power to second NIH component 406.2 included in second NIA component 404.2. Power is reduced to at least a level where the second operative coupling between second NIH component 406.2 and outside network 704.2 is disabled.

In an aspect, reducing power to a network interface hardware component in a network interface component may include changing a power state associated with the second network interface hardware component to at least one of an off state, a suspended state (i.e. sleep state), and a hibernate state.

In an aspect, network interface director component 454 in FIG. 4 may be operatively coupled to a power switch for controlling an electrical circuit providing power to second NIA component 404.2. In response to determining a decoupling condition is met, forwarding monitor component 452 may communicate, directly and/or indirectly, with network interface director component 454. Network interface director component 454 may set the switch on the circuit to cut off power to second NIH component 406.2 via second NIA component 404.2 to disable the second operative coupling of second NIH component 406.2 to outside network 704.2.

In a further aspect, a suspended state may include providing sufficient power to a network interface hardware component to access data in a memory component. The memory component may be included in a network interface component including the network interface hardware component. Network interface director component 554 in FIG. 5, may place second line card 504.2 in a suspended or sleep state by reducing power provided to and/or drawn by second line card 504.2 to disable the operatively coupling of second NIH component 506.2 to outside network 704.2. In the reduced power state, second line card 504.2 may be placed in an inoperative state for communication via second NIH component 506.2 with outside network 704.2. The reduced power state may provide sufficient power for second NIH component 506.2 to access data, such as state information in a memory component included in second line card 504.2. Second line card 504.2 may restore the operative coupling of second NIH component 506.2 to outside network 704.2 without performing a complete boot and/or initialization process based on data accessible from the memory component.

In another aspect, setting the power state of a second network interface component to a hibernate state may include saving state information to a data storage medium and powering off a network interface hardware component and optionally its including network interface component. The saved state information identifies an operational state of the network interface hardware component and optionally its including network interface component prior to, during, and/or just after determining a decoupling condition is met before disabling an operative coupling of the network interface hardware component to a network.

In an aspect, network interface director component 454 in FIG. 4 may request state information from second NIH component 406.2 and optionally from second NIA component 404.2. Network interface director component 454 may store the state information in a processor memory of an IPU in execution environment 402, in a memory component in second NIA component 404.2, and/or in a persistent data storage medium, such as a hard-drive. Network interface director component 454 may, subsequently, instruct a power switch controlling an electrical circuit providing power to some or all of the hardware including second NIH component 406.2 in second NIA component 404.2 to cut off power. Network interface director component 454 may interoperate with a switch controller (not shown) directly and/or indirectly via power manager 416 and/or second NIA component 404.2. In an aspect, second NIA component 404.2 in a hibernate state may restore the second operative coupling of second NIH component 406.2 to second network 704.2 and restore the saved operational state.

In still another aspect, the method illustrated in FIG. 2a may include receiving a coupling indication to enable the second operative coupling. The method may further include, enabling the second operative coupling, in response. Network interface director 454 in FIG. 4 may instruct power manager 416 controlling an electrical circuit providing power to second NIH component 406.2 to allow sufficient power to boot and/or initialize second network interface to enable the second operative coupling and/or may change a configuration of second NIH component 406.2 and/or second NIA component 404.2 to draw sufficient power.

When the second operative coupling is disabled, a node in inside network 704.1 may send data to another node via inside network 704.1. The data may be received by first line card 504.1 in FIG. 5. A determination that a forwarding condition is met may be performed by forwarding monitor component 552. The data may be data received for forwarding as determined by forwarding monitor component 552. Receiving data for forwarding may be configured as a coupling indication. In one aspect, any data received for forwarding may be configured as a coupling indication regardless of whether one of the nodes in the associated communication is in outside network 704.2. In another aspect, a coupling indication may be configured for data received for forwarding between a node in inside network 704.1 and a node in outside network 704.2. The coupling indication may be based on a direction for forwarding the received data between the two networks.

Alternatively or additionally, detecting a coupling indication may include forwarding data between a node in a third network included in inside network 704.1 and a node included in fourth network included in inside network 704.1. Data received for forwarding may be included in a request, a response, an asynchronous message, a broadcast communication, and/or multi-cast communication. The received data may be included in a message including a scoped network address. The scoped address may exclude and/or include a node in outside network 704.2 as a recipient.

In a further aspect, a coupling indication may be received while a second network interface component is in a suspended or sleep state. Enabling an operative coupling may include configuring a network interface hardware component in suspended state to change to an active state based on state information accessible in a memory component. In an aspect illustrated in FIG. 5, second line card 504.2 may be in a suspended state. State and/or other operational data may be stored in a volatile memory included in second line card 504.2 accessible to second NIH component 506.2. Network interface director component 554 may instruct power manager 516 to provide second NIH component 506.2 sufficient power to access the stored state and/or operational information to restore the second operative coupling to a state that existed prior to the disabling of the previously enabled second operative coupling.

In yet another aspect, a coupling indication to enable an operative coupling may be received for a network interface hardware component in hibernate state. Enabling the operative coupling may include configuring the network interface hardware component based on the accessible state information. In still another aspect, network interface director component 454 in FIG. 4 may restore power to second NIA component 404.2 as described above. Network interface director component 454 may determine whether second NIH component 406.2 was placed in hibernate state. For example, network interface director component 454 may locate state information stored in a hard-drive while power was cut off from second NIA component 404.2. Once located, network interface director component 454 may configure second NIH component 406.2 based on the stored state information to enable and restore the state of the second operative coupling.

In an aspect, a coupling indication may be an event identifying a particular time or a particular period of time having a specified duration. Network interface director component 454 in FIG. 4 may set a timer before, during, and/or after disabling the operative coupling to outside network 704.2. The timer may be configured with a specified duration. In response to detecting an expiration of the timer, network interface director component 454 may provide power for and/or otherwise instruction to enable the second operative coupling with outside network 704.2 of second NIH component 406.2

Alternatively or additionally, receiving a coupling indication may include receiving second data for forwarding between a node in the first network and another node. The other node may be in the second network or the node may be in the first network. In response to receiving the second data, the second operative coupling may be enabled by, for example, increasing power to one or more hardware components including the second NIH component in the second network interface component. The network relay may forward the data. The network relay may forward the data to a node in the second network. Alternatively or additionally, the data may be received for forwarding from a first portion of first network to a second portion of first network. In-between node 702 may include network interface hardware components operatively coupled to the first portion and the second portion, respectively.

In a further aspect, receiving the second data for forwarding may include determining that a forwarding condition is met. The forwarding condition may be met, in an aspect, when the other node is a node in the second network. Forwarding the second data in response to determining the forwarding condition is met includes forwarding the second data via the enabled second operative coupling of the second network interface to the second network.

FIG. 5 illustrates network interface director component 554 included in second line card 504.2, but not included in first line card 504.1. In an aspect, determining that a decoupling condition is met may have no effect on the operation of first line card 504.1. As described above, one or both forwarding monitors 552 may determine a decoupling condition is met. In response, network interface director component 554 may be instructed by one or both forwarding monitor components 552, directly and/or indirectly, to disable the second operative coupling to outside network 704.2. Network interface director component 554 may interoperate with second line card 504.2 to disable second NIH component 506.2 from detecting communications signals and/or generating communication signals on the physical communication medium physically included in second network 704.2 and physically coupled to second NIH component 506.2. Network interface director component 554 may direct second line card 504.2 to change its operating state to a state disabling the second operative coupling. In an aspect, this may be performed by changing configuration settings without cutting power to second NIH component 506.2.

Disabling an operative coupling to a network, in another aspect, may include setting a power state of a network interface hardware component to prevent receiving and optionally to prevent sending data via the second network. For example, line card 504.2 may include a wireless transmitter and a wireless receiver. Network interface director component 554 may disable the receiver but not the transmitter allowing messages to be forwarded from inside network 704.1 to outside network 704.2 but not from outside network 704.2 to inside network 704.1. Analogous to the description for FIG. 4, network interface director component 554 may cut and/or otherwise reduce power to some or all of line card 504.2 to disable the operative coupling to outside network 704.2.

With reference to FIG. 2b, block 260 illustrates the method includes detecting, by a network relay including a first network interface hardware component operatively coupled to a first network, first data for forwarding between a first node in the first network and an other node. Accordingly, a system for enabling an operative coupling to a network includes means for detecting, by a network relay including a first network interface hardware component operatively coupled to a first network, first data for forwarding between a first node in the first network and an other node. For example, as illustrated in FIG. 3b, interface activity monitor component 360 is configured for detecting, by a network relay including a first network interface hardware component operatively coupled to a first network, first data for forwarding between a first node in the first network and an other node.

FIG. 4 and FIG. 6 illustrate interface activity monitor component 460 and interface activity monitor component 660 as adaptations and/or analogs of interface activity monitor component 360 in FIG. 3b. One or more interface activity monitor components 460 operate in execution environment 402, and one or more interface activity monitor components 660 operate in execution environment 602.

FIG. 4 illustrates interface activity monitor (IAM) component 460 included in link layer 408 monitoring one or more network interface components including first NIA component 404.1. IAM component 460 may monitor other NIA components included in execution environment 402. FIG. 6 illustrates first IAM component 660.1 included in first line card 604.1 monitoring activity for first NIH component 606.1. Other line cards 604 in execution environment 602 may also include respective IAM components 660 according to various aspects. FIG. 6 illustrates second IAM component 660.2 in second line card 604.2. Multiple IAM components 660 are not required in all aspects for performing the method illustrated in FIG. 2b. FIG. 4 and FIG. 6 are but two examples of adaptations of IAM component 360. In various adaptations, an IAM component may detect data received for forwarding between inside node 706.1 in inside network 704.1 and another node. An IAM component may operate to detect data for forwarding in one or more protocol layers supported in various adaptations of a network relay.

In an aspect, the first node and the other node may be included in the first network. For example, the other node may be a third node in the first network. The first node may be in a first portion of the first network and the other node may be in an other portion. Forwarding data may include forwarding data by the network relay between the first portion and the other portion via the first operative coupling of the first network interface hardware component to the first portion and via an other operative coupling of an other network interface hardware component in the network relay to the other portion of the first network. Inside node 704.1 in FIG. 7 may be in a first subnet and/or a first LAN in inside network 704.1. A third node (not shown) may be in a second subnet and/or a second LAN in inside network 704.1. In one exemplary aspect, in-between node 702 may include a router for forwarding data between the first subnet and the second subnet in inside network 704.1. In another exemplary aspect, in-between node 702 may include a bridge or layer 2 switch for forwarding data between the first LAN and the second LAN.

FIG. 4 illustrates IAM component 460 operatively coupled to forwarding monitor component 452. IAM component 460 may receive information from forwarding monitor component 452 identifying, for example, an IP packet received for forwarding between the first subnet and the second subnet. Execution environment 402 may include a third network interface component 404.3 operatively coupled to the second subnet for receiving data from and/or sending data to the second subnet. First network interface component 404.1 may receive data from and/or send data to the first subnet. In an aspect, IAM component 460 operating in link layer 408 may detect data for forwarding between the first LAN and the second LAN based on information in one or more link layer protocols supported by link layer 408.

In FIG. 6, either or both first IAM component 660.1 and second IAM component 660.2 may detect data for forwarding between a node in the first LAN and a node in the second LAN. In another aspect, one or both of IAM components 660 may interoperate with GPU 612 and/or a component of GPU 612 to detect data for forwarding at another layer of inside network 704.1. Inside node 706.1 may be either or both a sender and a receiver of data for forwarding by in-between node 702.

In yet another aspect, the other node may be outside node 706.2 in outside network 704.2. In-between node 702 may receive data via inside network 704.1 from inside node 706.1 for forwarding to outside node 706.2 via outside network 704.2. The data for forwarding may be detected at any of various network layers included in one or both of inside network 704.1 and outside network 704.2 as described above.

In still another aspect, receiving for forwarding may include receiving a message addressed to the network relay, including an indication of the data for forwarding between the first node and another node. The message may be from the first node, the other node, and/or a node other than the first node and other than the other node. For example, a network management node including a network sniffer may send a message to the network relay identifying and/or otherwise providing an indication of the data for forwarding. Alternatively or additionally, in-between node 702 may receive a message from a bridge, router, switch, and/or other network relay in inside network 704.1 identifying and/or otherwise providing an indication of the data for forwarding. In still another aspect, in-between node 702 may receive a message from an authorization service operating in a node in inside network 704.1. The authorization service may receive a request to authorize communication between inside node 706.1 and the other node. The authorization service may identify and/or otherwise provide an indication of the data for forwarding based on the request and/or in response to authorizing the communication.

The method illustrated in FIG. 2b may include receiving previous data before detecting the first data. A determination may be made that a forwarding condition is not met for the previous data. The previous data may be identified as data not for forwarding in response to determining the forwarding condition is not met. If the second operative coupling is disabled, the method may include leaving the second operative coupling disabled based on the determination that the forwarding condition is not met.

In an aspect, a forwarding condition may specify that the node in communication with the first node be in the second network. For example, if the detected data for forwarding is between inside node 706.1 and an other node in inside network 704.1, in-between node 702 may be configured to not determine the operational state of the second operative coupling. For example, forwarding component 450 may invoke network interface state component 462 when the detected communication is between nodes in inside network 704.1 and outside network 704.2 and not invoke or otherwise interoperate with network interface state component 462 when a detected communication does not included a node in outside network 704.2.

As described above, detecting data for forwarding may include determining that a forwarding condition is met. Determining that a forwarding condition is met may include determining that an attribute of the detected data matches a forwarding criterion identified by the forwarding condition. One or more of network interface state component 662 in FIG. 6 and/or network interface state component 462 in FIG. 4 may determine whether a forwarding condition is met to determine whether received data is data for forwarding.

An attribute of received data and/or a forwarding criterion may be based on the first network, the second network, the first node, the second node, a protocol for at least one of sending and receiving the first data, at least one of an application sending the first data and an application identified as a recipient of the first data, a user identified with the first data, a node in a network path in a route in communicating the first data, a type of at least a portion of the first data, a pattern included in the first data, a value included in the first data, a geospatial location of a node included in communicating the first data, a sender of the first data, a receiver of the first data, and a relationship between a sender of the first data and a receiver of the first data. In response to determining a forwarding condition is met, network interface state component 462 in FIG. 4 may determine whether the second operative coupling of second NIH component 406.2 to outside network 704.2 is disabled.

Returning to FIG. 2b, block 262 illustrates the method further includes determining that a second operative coupling of a second network interface hardware component in the network relay to a second network is disabled. Accordingly, a system for enabling an operative coupling to a network includes means for determining that a second operative coupling of a second network interface hardware component in the network relay to a second network is disabled. For example, as illustrated in FIG. 3b, network interface state component 362 is configured for determining that a second operative coupling of a second network interface hardware component in the network relay to a second network is disabled.

FIG. 4 and FIG. 6 respectively illustrate network interface state component 462 and network interface state component 662 as adaptations and/or analogs of network interface state component 362 in FIG. 3b. One or more network interface state components 462 operate in execution environment 402, and one or more network interface state components 662 operate in execution environment 602.

Network interface state component 462 in FIG. 4 operates in network interface director component 454 and may maintain and/or otherwise monitor operational state information for one or more NIA components 404 in execution environment 402 including second NIA component 404.2. In one aspect, network interface state component 462 may request operational state information from second NIA component 404.2.

In another aspect, determining an operative coupling is disabled may include monitoring a source of power for a network interface hardware component. Network interface state component 462 may interoperate with power manager 416 to monitor a power source (not shown) for second NIA component 404.2 to determine the current operational state of the second operative coupling between second NIH component 406.2 and outside network 704.2. Alternatively or additionally, network interface state component 462 in FIG. 4 may include and/or otherwise interoperate with a sensor configured to monitor power utilized by second NIH component 406.2.

In an aspect, monitoring a power source may include one or more of detecting a coupling-threshold condition is met indicating the second operative coupling is enabled, determining that an off-threshold condition is met indicating the second network interface hardware component is not receiving power and indicating the second operative coupling is disabled, and determining that a suspend-threshold condition is met indicating the second operative coupling is disabled and indicating the second network interface hardware component and/or its including network interface component is receiving sufficient power to access data stored in a memory component.

A coupling-threshold condition may be specified to define a level of power that when met or exceeded indicates that the second operative coupling of second NIH component 406.2 and outside network 704.2 is enabled. An off-threshold condition may define a level of power that when met or is less indicates second NIH component 406.2 is powered off and the second operative coupling is disabled. A suspended-threshold condition may specify a range, for example by identifying a pair of power values. The suspend-threshold condition may specify that a sensed measure of power in the range defined by the suspended-threshold condition (inclusive and/or exclusive of the range boundaries as defined by the suspended-threshold condition) indicates second NIH component 406.2 is in a low-power state where the operative coupling of second NIH component 406.2 to outside network 704.2 is disabled.

FIG. 6 illustrates second network interface state component 662.2 included in second line card 604.2. One or more other line cards 604 may also include respective network interface state components 662. A network interface state component 662 may be configured to operate analogous to network interface state component 462 in various aspects described providing services for a single line card and/or its included network interface hardware component. While a network interface hardware component 606 along with its including network interface component may support any of various states described above with respect to NIH component 406, a line card 604 hosting a network interface state component 662 may draw sufficient power to allow for the operation of its included network interface state component 662. In an aspect, a network interface state component 662 may store state information external to its hosting line card 604 allowing the line card 604 to be set in an off state utilizing no power. Other components in execution environment 602 may check the stored state information. A network interface state component, in an aspect, may operate at least partially in a network interface component and/or at least partially external to a network interface component.

In an aspect, determining that the second operative coupling is disabled may include accessing the second network interface component including the second network interface hardware component for at least one of sending and receiving data via the second network. In response to accessing the second network interface component, an error indication may be received and/or state information may be accessed and/or identified for determining whether a current state of the second network interface component indicates the second operative coupling is disabled. As used herein, an access includes an access attempt. An access may not be successful, but is still considered an access.

For example, as described above, in-between node 702 may detect data for forwarding between inside node 706.1 and outside node 706.2. Detecting the data may include receiving the data via first NIH component 606.1 operating in in-between node 702 from inside node 706.1 to transmit to outside node 706.2. First NIH component 606.1 may interoperate with first RA component 608.1 to determine that the data is to be forwarded to second line card 604.2 for transmitting the received data to outside node 706.2. First FA component 650.1 may be invoked to interoperate with first SI component 618.1 to configure a channel in SIU 616 for communicating the data to second line card 604.2 for transmitting by second NIH component 606.2.

In one aspect, first SI component 618.1 may receive and/or detect a failure or error in establishing a channel. For example, second line card 604.2 may be powered off and SIU 616 may provide an indication to first SI component 618.1 that the channel could not be configured. Alternatively, second line card 604.2 may be operating, but second NIH component 606.2 may be powered off or in a low power state indicating the second operative coupling to second network 704.2 is disabled. Second line card 604.2, in one aspect, may provide an error indication during channel configuration. In another aspect, channel configuration may succeed, and second line card 604.2 may return an error in response to detecting second NIH component 606.2 is not operatively coupled to second network 704.2.

In still another aspect, second network interface state component 662.2 may share current operational state information with one or more other line cards 604. First network interface state component 662 may store and/or otherwise access the shared information prior to attempting to setup a channel via SIU 616 to determine that the second operative coupling between in-between node 702 and outside network 704.2 is disabled. In another example, network interface state component 462 in FIG. 4 may detect current power flow to second NIH component 406.2 to determine the second operative coupling is disabled.

Returning to FIG. 2b, block 264 illustrates the method yet further includes, in response to detecting the first data for forwarding, configuring the second network interface hardware component to enable the second operative coupling. Accordingly, a system for enabling an operative coupling to a network includes means for, in response to detecting the first data for forwarding, configuring the second network interface hardware component to enable the second operative coupling. For example, as illustrated in FIG. 3b, interface activator component 364 is configured for, in response to detecting the first data for forwarding, configuring the second network interface hardware component to enable the second operative coupling.

FIG. 4 and FIG. 6 respectively illustrate interface activator component 464 and interface activator component 464 as adaptations and/or analogs of interface activator component 364 in FIG. 3b. One or more interface activator components 464 operate in execution environment 402, and one or more interface activator components 664 operate in execution environment 602.

In an aspect, enabling the second operative coupling may include determining whether the second network interface hardware component is in a off state receiving no power, in a suspended state receiving sufficient power for accessing data stored in a memory component, and/or in a hibernate state receiving no power and having state information stored in a data storage medium. In an aspect, network interface state component 462 in FIG. 4 may instruct and/or otherwise indicate to interface activator component 464 to enable the operative coupling between second NIH component 406.2 and outside network 704.2.

In an aspect, configuring a network interface hardware component may include increasing power provided to the network interface hardware component. In an aspect, interface activator component 464 may interoperate with power manager 416 to send a signal to enable a circuit allowing power to flow to second NIA component 404.2 increasing power provided to second NIH component 406.2.

In a further aspect, configuring a second network interface hardware component may additionally include determining the second network interface hardware component is in a suspended state, and enabling the second operative coupling by accessing data in a memory component. In FIG. 5, second network NIH component 606.2 component may be powered down disabling the second operative coupling. Second NIH component 606.2 when receiving sufficient power may access data in a memory component included in second line card 604.2. Line card 604.2 may be provided sufficient power to maintain the data in the memory component while power provided to second network NIH component 606.2 is reduced or eliminated. Enabling the second operative coupling may include increasing power provided for second NIH component 606.2. Second NIH component 606.2 may access the memory component to access data to restore or continue an operational state enabling the second operative coupling.

In another aspect, configuring a network interface hardware component may include determining the network interface hardware component is in a hibernate state, and enabling the second operative coupling by providing power to the second network interface hardware component and providing state information in data stored in a data storage medium to the network interface hardware component. In FIG. 4, network interface state component 462 may determine the second NIA component 404.2 is in a hibernate state by checking a measure of power provided to second NIA component 404.2 and by checking for the presence of saved state information in a data storage medium in execution environment 402. Network interface state component 462 may interoperate with interface activator component 464 to instruct power manager 416 to provide power to second NIA component 404.2 and/or second NIH component 406.2. Network interface state component 462 may interoperate with interface activator component 464 to provide the state information from the data storage medium to second NIH component 406.2 and/or instruct second NIA component 404.2 to access the information and provide it to second NIH component 406.2 to enable the second operative coupling and restore the state of second NIH component 406.2 saved during and/or prior to hibernation.

In FIG. 6, first network interface state component 662.1 in FIG. 6 may interoperate with second interface activator component 664.2 to analogously adjust power available to second NIH component 606.2 to enable the operative coupling with outside network 704.2. Alternatively or additionally, first network interface state component 662.1 may communicate with second interface activator component 664.2 via second network interface state component 662.2 as illustrated in FIG. 6 and/or may communicate directly and/or indirectly with second interface activator component 664.2 via other suitable mechanisms in other aspects and adaptations.

In still another aspect, first interface activator component 664.1 may communicate with a power management component (not shown) to provide and/or adjust power available to second NIH component 606.2 and/or second line card 604.2. This and other analogous adaptations for configuring power control for second NIH component 606.2 external to second line card 604.2 may allow second line card 604.2 to be powered down or otherwise use less power in one or more states when the second operative coupling between second NIH component 606.2 and outside network 704.2 is disabled.

Alternatively or additionally, interface activator 464 in FIG. 4 may change one or more configuration settings processed by second NIA component 404.2 and/or components that interoperate with second NIH component 406.2 to enable the second operative coupling to outside network 704.2. These setting may or may not be associated with power management for second NIH component 406.2. One or both interface activators 664 in FIG. 6 may similarly change and/or otherwise provide for changing configuration settings for enabling the second operative coupling of second NIH component 606.2 and/or second line card 604.2 to outside network 704.2. Changing a configuration setting may include storing data and/or deleting data in a storage location accessible to a network interface hardware component and/or its including network interface component. Data may include executable code and/or data for processing by executable code and/or hardware in second network interface component 606.2 and/or second line card 604.2.

Returning to FIG. 2b, block 266 illustrates the method additionally includes forwarding, via the enabled second operative coupling, data received for forwarding between the first network and the second network. Accordingly, a system for enabling an operative coupling to a network also includes means for forwarding, via the enabled second operative coupling, data received for forwarding between the first network and the second network. For example, as illustrated in FIG. 3b, the forwarding component 350' is configured for forwarding, via the enabled second operative coupling, data received for forwarding between the first network and the second network.

FIG. 4 and FIG. 6 respectively illustrate forwarding component 450 and forwarding component 650 as adaptations and/or analogs of forwarding component 350' in FIG. 3b. One or more forwarding components 450 operate in execution environment 402, and one or more forwarding components 650 operate in execution environment 602.

Various aspects and adaptations of forwarding component 350' in FIG. 3b, such as forwarding component 450 in FIG. 4, and forwarding component 650 in FIG. 6, may forward data in a communication initiated by inside node 706.1 and/or by outside node 706.2 according to various aspects and adaptations described above. In some aspects, in response to enabling the second operative coupling to outside network 704.2 the first data forwarded is forwarded from inside network 704.1 to outside network 704.2 according to a coupling condition. In other aspects, the first data forwarded may be sent from a node in either network 704. A firewall, network address translations (NAT) service, or other network access service may support and/or circumvent operation of various aspects of various adaptations of the arrangement in FIG. 3b.

Forwarding data between inside node 706.1 and outside node 706.2 is described above in various aspects with respect to FIG. 4, FIG. 5, and FIG. 6.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that are configured to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more instruction processing units, or by a combination of both. The description herein of any sequence of actions is not intended to imply that the specific order described for performing that sequence must be followed.

Moreover, the methods described herein may be embodied in executable instructions stored in a computer readable storage medium for use by or in connection with an instruction execution machine, system, apparatus, or device, such as a computer-based or processor-containing machine, system, apparatus, or device. As used here, a "computer readable storage medium" may include one or more of any suitable media for storing the executable instructions of a computer program in one or more of an electronic, magnetic, optical, and electromagnetic form, such that the instruction execution machine, system, apparatus, or device may read (or fetch) the instructions from the computer readable storage medium and execute the instructions for carrying out the described methods. A non-exhaustive list of conventional exemplary computer readable storage medium includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), a Blu-ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating any non-claimed element is essential to the practice of the subject matter as claimed.

I claim:

1. A method for disabling an operative coupling to a network, the method comprising: forwarding first data, received for forwarding between a first node in a first network and a second node in a second network, by a network relay via at least one of a first operative coupling to the first network of a first network interface hardware component in the network relay and a second operative coupling to the second network of a second network interface hardware component in the network relay; determining a specified decoupling condition is met while a third enabled operative coupling exists between a third network interface hardware component and the second network, wherein the decoupling condition is based on at least one of the first network, the second network, the first node, the second node, a protocol for at least one of sending and receiving the first data, at least one of an application sending the first data and an application identified as a recipient of the first data, a user identified with the first data, a node in a network path in a route in communicating the first data, a type of at least a portion of the first data, a pattern included in the first data, a value included in the first data, a geospatial location of a node included in communicating the first data, a sender of the first data, a receiver of the first data, a relationship between a sender of the first data and a receiver of the first data; and subsequent to forwarding the first data and in response to determining the decoupling condition is met, disabling the second operative coupling while the first operative coupling remains enabled for receiving second data for forwarding.

2. The method of claim 1 wherein the network relay includes at least one or a modem, a gateway, a router, a switch, a hub, a bridge, a repeater, a firewall, a network address translation (NAT) service, a virtual private network (VPN) concentrator, a demilitarized zone (DMZ) gateway, a desktop computer, a server, a mobile computer, and a network tunnel.

3. The method of claim 1 wherein forwarding the first data comprises: receiving the first data via one of the first operative coupling and the second operative coupling; determining that a specified forwarding condition is met for the received first data; and identifying the first data is data received for forwarding, in response to determining the forwarding condition is met.

4. The method of claim 3 wherein determining the forwarding condition is met includes determining an attribute of the received first data matches a forwarding criterion identified by the forwarding condition.

5. The method of claim 4 wherein the at least one of the attribute and the forwarding criterion is based on at least one of the first network, the second network, the first node, the second node, a protocol for at least one of sending and receiving the first data, at least one of an application sending the first data and an application identified as a recipient of the first data, a user identified with the first data, a node in a network path in a route in communicating the first data, a type of at least a portion of the first data, a pattern included in the first data, a value included in the first data, a geospatial location of a node included in communicating the first data, a sender of the first data, a receiver of the first data, and a relationship between a sender of the first data and a receiver of the first data.

6. The method of claim 1 wherein determining the decoupling condition is met includes detecting an idle period, based on specified measure of time, during which no data is received for forwarding by the network relay via at least one of the first operative coupling and the second operative coupling.

7. The method of claim 6 wherein detecting the idle period comprises: configuring, along with forwarding the first data, an idle indication to be received that indicates when received that no data has been received for forwarding during the idle period; receiving the idle indication; and determining the decoupling condition is met in response to receiving the idle indication.

8. The method of claim 7 wherein receiving the idle indication comprises:
accessing a value from an event counter; and determining the value meets a specified threshold condition.

9. The method of claim 8 wherein the event counter includes a count of at least one of timer interrupts, instructions executed by an IPU, IPU cycles, bytes received via a network, bytes transmitted via a network, messages received, messages transmitted, and messages forwarded.

10. The method of claim 1 wherein determining the decoupling condition is met includes at least one of detecting a specified time, detecting an identified node is operatively coupled to at least one of the first network and the second network, detecting a node is not operatively coupled to at least one of first network and the second network, detecting that an identified application is not active in a node in at least one of the first network and the second network, and determining that data received via at least one of the first operative coupling and the second operative coupling matches a specified decoupling matching criterion.

11. The method of claim 1 wherein disabling the operative coupling includes reducing power to the second network interface hardware component.

12. The method of claim 11 wherein reducing power includes changing a power state associated with the second network interface hardware component to at least one of an off state, a suspended, and a hibernate state.

13. The method of claim 12 wherein the suspended state includes providing sufficient power to the second network interface hardware component to access data stored in a memory component.

14. The method of claim 12 wherein changing the power state to the hibernate state comprises: saving, to a data storage medium, state information identifying an operational state of the second network interface hardware component prior to disabling the second operative coupling; providing no power to the second network interface hardware component.

15. The method of claim 1 wherein the method, subsequent to disabling the second operative coupling, further comprises: receiving a coupling indication to enable the second operative coupling; and enabling the second operative coupling in response to receiving the coupling indication.

16. The method of claim 15 wherein the receiving the coupling indication comprises: setting a timer for a specified duration; and detecting an expiration of the timer.

17. The method of claim 15 wherein receiving the coupling indication comprises: receiving second data for forwarding between a node in the first network and another node; in response to receiving the second data, enabling the second operative coupling; and forwarding the second data.

18. The method of claim 17 wherein receiving the second data for forwarding includes determining that a forwarding condition is met for the second data.

19. The method of claim 18 wherein determining the forwarding condition is met includes determining the other node is in the second network and forwarding the second data includes forwarding the second data via the second operative coupling.

20. A system for disabling an operative network coupling, the system comprising: an execution environment including an instruction processing unit configured to process an instruction included in at least one of a forwarding component is executed by the instruction processing unit; a forwarding monitor component, and a network interface director component; the forwarding component configured for forwarding first data received for forwarding between a first node in a first network and a second node in a second network by a network relay via a first operative coupling to the first network of a first network interface hardware component in the network relay and via at least one of a second operative coupling to the second network of a second network interface hardware component in the network relay; the forwarding monitor component configured for determining a specified decoupling condition is met while a third enabled operative coupling exists between a third network interface hardware component and the second network, wherein the decoupling condition is based on at least one of the first network, the second network, the first node, the second node, a protocol for at least one of sending and receiving the first data, at least one of an application sending the first data and an application identified as a recipient of the first data, a user identified with the first data, a node in a network path in a route in communicating the first data, a type of at least a portion of the first data, a pattern included in the first data, a value included in the first data, a geospatial location of a node included in communicating the first data, a sender of the first data, a receiver of the first data, a relationship between a sender of the first data and a receiver of the first data; and the network interface director component configured for subsequent to forwarding the first data and in response to determining the decoupling condition is met, disabling the second operative coupling while the first operative coupling remains enabled for receiving second data for forwarding.

21. A non-transitory computer readable storage medium embodying a computer program, executable by a machine, for disabling an operative coupling to a network, the computer program comprising executable instructions for: forwarding first data received for forwarding between a first node in a first network and a second node in a second network by a network relay via at least one of a first operative coupling to the first network of a first network interface hardware component in the network relay and via a second operative coupling to the second network of a second network interface hardware component in the network relay; determining a specified decoupling condition is met while a third enabled operative coupling exists between a third network interface hardware component and the second network, wherein the decoupling condition is based on at least one of the first network, the second network, the first node, the second node, a protocol for at least one of sending and receiving the first data, at least one of an application sending the first data and an application identified as a recipient of the first data, a user identified with the first data, a node in a network path in a route in communicating the first data, a type of at least a portion of the first data, a pattern included in the first data, a value included in the first data, a geospatial location of a node included in communicating the first data, a sender of the first data, a receiver of the first data, a relationship between a sender of the first data and a receiver of the first data and subsequent to forwarding the first data and in response to determining the decoupling condition is met; and disabling the second operative coupling while the first operative coupling remains enabled for receiving second data for forwarding.

* * * * *